(12) United States Patent
Banno et al.

(10) Patent No.: US 9,735,705 B2
(45) Date of Patent: Aug. 15, 2017

(54) POWER CONVERSION DEVICE

(71) Applicant: FUJI ELECTRIC CO., LTD., Kawasaki-shi (JP)

(72) Inventors: Seitaro Banno, Hachioji (JP); Satoru Fujita, Akishima (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 412 days.

(21) Appl. No.: 14/622,813

(22) Filed: Feb. 13, 2015

(65) Prior Publication Data

US 2015/0162850 A1 Jun. 11, 2015

Related U.S. Application Data

(63) Continuation of application No. PCT/JP2012/005221, filed on Aug. 21, 2012.

(51) Int. Cl.
| | |
|---|---|
| *H02M 7/00* | (2006.01) |
| *H02M 7/5395* | (2006.01) |
| *H02M 7/48* | (2007.01) |
| *H02M 5/458* | (2006.01) |
| *H02J 9/06* | (2006.01) |

(Continued)

(52) U.S. Cl.
CPC .......... *H02M 7/5395* (2013.01); *H02J 9/062* (2013.01); *H02M 1/10* (2013.01); *H02M 5/297* (2013.01); *H02M 5/4585* (2013.01); *H02M 7/48* (2013.01); *H02M 2005/2932* (2013.01); *Y10T 307/549* (2015.04)

(58) Field of Classification Search
CPC ....................................................... H02M 7/00
See application file for complete search history.

(56) References Cited

U.S. PATENT DOCUMENTS

| | | | |
|---|---|---|---|
| 7,391,132 B2 * | 6/2008 | Chen ....................... | H02J 9/062 307/43 |
| 8,861,240 B2 * | 10/2014 | Yoshikawa ........... | H02M 7/537 363/132 |

(Continued)

FOREIGN PATENT DOCUMENTS

| | | |
|---|---|---|
| EP | 2424100 A2 | 2/2012 |
| JP | 07-337036 A | 12/1995 |

(Continued)

*Primary Examiner* — Hai L Nguyen
(74) *Attorney, Agent, or Firm* — Rabin & Berdo, P.C.

(57) ABSTRACT

In a power conversion device, a constant voltage can be supplied even when the voltage of an alternating current power supply fluctuates. A switching element Q1 and switching element Q2 are connected to a direct current power supply series circuit. A connection point of a direct current power supply and direct current power supply is a neutral point terminal, a connection point of the switching element Q1 and switching element Q2 is an output terminal, switch elements S1 and S2 are connected between the output terminal and neutral point terminal, switch elements S3 and S4 are connected between a terminal R of an alternating current power supply having a terminal S connected to the neutral point terminal, and the output terminal, and a first element and second element selected from among the switching elements Q1 and Q2 and switch elements S1 to S4 are turned on and off complementarily.

20 Claims, 18 Drawing Sheets

(51) Int. Cl.
*H02M 5/297* (2006.01)
*H02M 1/10* (2006.01)
*H02M 5/293* (2006.01)

(56) References Cited

U.S. PATENT DOCUMENTS

| | | |
|---|---|---|
| 9,397,582 B2 * | 7/2016 | Wang .................... H02M 5/293 |
| 9,450,509 B2 * | 9/2016 | Kouno .................. H02M 7/219 |
| 2006/0119184 A1 | 6/2006 | Chen |
| 2011/0051478 A1 | 3/2011 | Sato et al. |
| 2012/0044728 A1 | 2/2012 | Yatsu et al. |
| 2013/0235625 A1 | 9/2013 | Yamada |

FOREIGN PATENT DOCUMENTS

| | | |
|---|---|---|
| JP | H10-75581 A | 3/1998 |
| JP | H11-113257 A | 4/1999 |
| JP | H11-178216 A | 7/1999 |
| JP | 2003-230276 A | 8/2003 |
| JP | 2003-230277 A | 8/2003 |
| JP | 2012-044824 A | 3/2012 |
| WO | WO-2012/067167 A1 | 5/2012 |

\* cited by examiner

FIG. 2
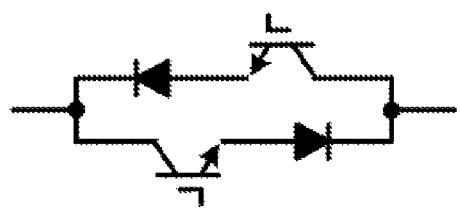
(a)
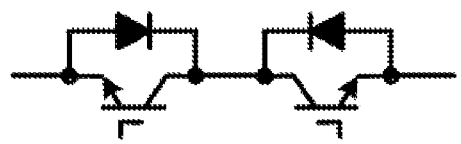
(b)
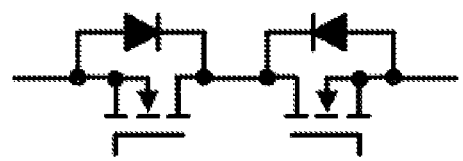
(c)

FIG. 4

| VOLTAGE COMMAND (Vu*) | ALTERNATING CURRENT POWER SUPPLY VOLTAGE (Vr) | Vr AND Vu* COMPARISON | δ (REGION) | α (PULSE WIDTH COMMAND) | CONTROL SIGNAL | | | | | |
|---|---|---|---|---|---|---|---|---|---|---|
| | | | | | G1 | G2 | Gs1 | Gs2 | Gs3 | Gs4 |
| Vu* ≥ Vz | Vr ≤ Vz | — | REGION 1 | Vu* / Vp | Hon | L | L | L | H | Lon |
| | Vr > Vz | Vu* > Vr | REGION 2 | (Vu*−Vr) / (Vp−Vr) | Hon | L | H | Lon | L | L |
| | | Vu* ≤ Vr | REGION 3 | Vu* / Vr | L | L | Hon | H | H | Lon |
| Vu* < Vz | Vr < Vz | Vu* ≥ Vr | REGION 4 | (Vu*−Vr) / (Vn−Vr) | L | L | H | Hon | Lon | H |
| | | Vu* < Vr | REGION 5 | Vu* / Vr | L | Hon | Lon | H | L | L |
| | Vr ≥ Vz | — | REGION 6 | Vu* / Vn | L | Hon | L | L | Lon | H |

FIG. 11

| VOLTAGE COMMAND (Vu*) | ALTERNATING CURRENT POWER SUPPLY VOLTAGE (Vr) | Vr AND Vu* COMPARISON | δ (REGION) | α (PULSE WIDTH COMMAND) | CONTROL SIGNAL | | | | | |
|---|---|---|---|---|---|---|---|---|---|---|
| | | | | | G1 | G2 | Gs1 | Gs2 | Gs3 | Gs4 |
| Vu* ≧ Vz | Vr ≦ Vz | — | REGION 1 | Vu* / Vp | Hon | L | L | L | H | Lon |
| | Vr > Vz | Vu* > Vr | REGION 2 | (Vu*−Vr) / (Vp−Vr) | Hon | L | H | Lon | L | L |
| | | Vu* ≦ Vr | REGION 3 | Vu* / Vr | L | L | Hon | H | H | Lon |
| Vu* < Vz | | Vu* ≧ Vr | REGION 4 | Vu* / Vr | L | Hon | H | Hon | Lon | L |
| | Vr < Vz | Vu* < Vr | REGION 5 | (Vu*−Vr) / (Vn−Vr) | L | Hon | Lon | H | L | H |
| | Vr ≧ Vz | — | REGION 6 | Vu* / Vn | L | L | L | H | Lon | L |
| |Vu*−Vr| < ΔVu* | | | REGION 7 | 1.0 (100%) | L | L | H | H | L | L |

POWER CONVERSION DEVICE

This application is a continuation under 35 U.S.C. 120 of International Application PCT/JP2012/005221 having the International Filing Date of Aug. 21, 2012. The identified application is fully incorporated herein by reference.

BACKGROUND

Technical Field

The present invention relates to a power conversion device such that it is possible to supply a stable voltage to a load, even when voltage fluctuation in an alternating current power supply or interruption of the alternating current power supply occurs.

Background Art

FIG. 17 is a diagram for illustrating a continuous inverter power supply type of power conversion device disclosed in PTL 1. The power conversion device temporarily converts voltage of an alternating current power supply into direct current voltage, then converts the direct current voltage into alternating current voltage again, and supplies the alternating current voltage to a load.

In the diagram, 1 is a single-phase alternating current power supply, 2 is a capacitor, 3 is a converter circuit, 4 is an inverter circuit, 5 is a filter circuit, and 6 is a load. The capacitor 2 is connected to both ends of the alternating current power supply 1.

An alternating current input terminal of the converter circuit 3 is connected to one end of the alternating current power supply 1. One end of a reactor L is connected to the alternating current input terminal inside the converter circuit 3. The other end of the reactor L is connected to a connection midpoint of a switching element series circuit wherein switching elements Qp and Qn are connected in series. A capacitor series circuit wherein capacitors Cp and Cn are connected in series is connected to both ends of the switching element series circuit. A connection midpoint of the capacitor series circuit is connected to the other end of the alternating current power supply 1. The converter circuit 3 causes the switching elements Qp and Qn to be turned on and off, thereby rectifying the voltage of the alternating current power supply 1, and charging the capacitors Cp and Cn to a predetermined voltage. The capacitors Cp and Cn charged to the predetermined voltage form a direct current power supply.

The inverter circuit 4 is constructed of switching elements Q1 and Q2 connected in series. The inverter circuit 4 is connected to a direct current output terminal of the converter circuit 3. The inverter circuit 4 causes the switching elements Q1 and Q2 to be turned on and off, thereby converting the voltage of the direct current power supply formed of the capacitors Cp and Cn into alternating current voltage.

The filter circuit 5 is configured by a reactor Lf1 and capacitor Cf1 being connected in series. One end of the filter circuit 5 is connected to a connection midpoint of the switching elements Q1 and Q2. Also, the other end of the filter circuit 5 is connected to a connection midpoint of the capacitor series circuit. The filter circuit 5 removes the high frequency contents from the alternating current voltage output by the inverter circuit 4.

One end of the load 6 is connected to a connection point of the reactor Lf1 and capacitor Cf1. Also, the other end of the load 6 is connected to the other end of the alternating current power supply 1. The alternating current voltage output by the inverter circuit 4 is supplied via the filter circuit 5 to the load 6.

FIG. 18 is a diagram for illustrating a continuous commercial power supply type of power conversion device disclosed in PTL 2.

In the diagram, a switch 7 and a secondary coil of a transformer 8 are connected in series between the alternating current power supply 1 and the load. The connection relationships among the converter circuit 3, inverter circuit 4, filter circuit 5, and capacitor 2 are the same as in the embodiment of FIG. 17. Further, an alternating current input terminal of the converter circuit 3 is connected to one end of a primary coil of the transformer 8. Also, a connection midpoint of the capacitor series circuit is connected to the other end of the alternating current power supply 1, and is connected to the other end of the primary coil of the transformer 8. Further, a connection point of the reactor Lf1 and capacitor Cf1 is connected to one end of the load 6.

The power conversion device is such that when the alternating current power supply 1 is sound, the voltage thereof is supplied to the load. Further, when the voltage of the alternating current power supply 1 drops, the converter circuit 3 causes the switching elements Qp and Qn to be turned on and off. In accordance with these operations, compensating voltage for compensating for the drop in the voltage of the alternating current power supply 1 is generated on the primary side of the transformer 8. The compensating voltage is superimposed on the voltage of the alternating current power supply 1 via the transformer 8. Further, voltage that is the compensating voltage superimposed on the voltage of the alternating current power supply 1 is supplied to the load 6. In this case, charging of the capacitor series circuit is carried out by the inverter circuit 4.

Also, when the alternating current power supply 1 is interrupted, the switch 7 is disengaged. Further, the inverter circuit 4 causes the switching elements Q1 and Q2 to be turned on and off, thereby converting the direct current voltage of the capacitor series circuit into alternating current voltage, and supplying the alternating current voltage to the load 6.

CITATION LIST

Patent Literature

PTL 1: JP-A-7-337036
PTL 2: JP-A-11-178216

However, the power conversion device shown in FIG. 17 is such that the converter circuit 3 and inverter circuit 4 are needed when supplying alternating current voltage to the load 6. Further, the current flowing through the load flows at least once through the switching elements of each of the converter circuit 3 and inverter circuit 4. Because of this, conduction loss occurs in each of the converter circuit 3 and inverter circuit 4. Also, when the switching elements of the converter circuit 3 and inverter circuit 4 carry out on-off operations, the voltage of the direct current power supply formed of the capacitors Cp and Cn is applied to each switching element. Because of this, switching loss in accordance with the voltage value of the direct current power supply occurs in each switching element.

Consequently, the technology disclosed in PTL 1 is such that there is considerable power loss formed of switching element conduction loss and switching loss. There is a problem in that large switching element power loss leads to a drop in the conversion efficiency of the power conversion device.

Also, the power conversion device shown in FIG. 18 is such that the transformer 8 is needed in order to compensate for a drop in the voltage of the alternating current power supply 1. The transformer 8 is large, as it needs to function at a commercial frequency. Furthermore, the power conversion device shown in FIG. 18 is such that when the alternating current power supply 1 is interrupted, a predetermined alternating current voltage is supplied to the load 6 by the operations of the converter circuit 3 and inverter circuit 4 being switched.

Consequently, the technology disclosed in PTL 2 is such that there is a problem in that a commercial frequency transformer is needed, which leads to an increase in the size of the power conversion device. Also, there is a problem in that disturbance of the alternating current output voltage occurs in accompaniment to the switching of the operations of the converter circuit 3 and inverter circuit 4.

SUMMARY

The invention has been contrived in order to resolve the problems of these kinds of existing technology. That is, an object of the invention is to provide a power conversion device that can output alternating current voltage, without causing disturbance, when there is a drop in the voltage of an alternating current power supply or when the alternating current power supply is interrupted. Also, an object of the invention is to provide a power conversion device such that power loss can be reduced. Also, an object of the invention is to provide a power conversion device such that there is no need for a commercial frequency transformer for voltage superposition when carrying out a voltage compensating operation.

In order to achieve the heretofore described objects, the invention is applied to a power conversion device including an inverter circuit formed of a switching element series circuit and first and second bidirectional switches. Input power supplies of the inverter circuit are an alternating current power supply and a direct current power supply series circuit, formed by first and second direct current power supplies being connected in series, wherein a neutral point terminal, which is a series connection point of the first and second direct current power supplies, is connected to one end of the alternating current power supply. A first output terminal of the inverter circuit is a series connection point of the switching element series circuit, and a second output terminal is the neutral point terminal.

The switching element series circuit is formed by a positive side switching element and negative side switching element being connected in series. The switching element series circuit is connected between a positive side terminal and negative side terminal of the direct current power supply series circuit. The first bidirectional switch is formed by a first switch element and second switch element being connected in anti-parallel or anti-series. The first bidirectional switch is connected between the other end of the alternating current power supply and the first output terminal. The second bidirectional switch is formed by a third switch element and fourth switch element being connected in anti-parallel or anti-series. The second bidirectional switch is connected between the first and second output terminals.

The power conversion device includes a control circuit. The control circuit generates control signals for causing the positive side and negative side switching elements and first to fourth switch elements to carry out on-off operations. The control circuit divides the cycle of a voltage command into a plurality of control periods when generating the control signal for each element. The control circuit selects first and second elements from among the positive side and negative side switching elements and first to fourth switch elements in each control period. Selection of the first and second elements in each control period is carried out based on the relationship between the sizes of the alternating current power supply voltage and voltage command. Control signals of the first and second elements are signals that are pulse width modulated in each control period, and are turned on and off in a complementary way either side of an idle period. Also, the control circuit generates control signals for keeping each of the elements other than the elements selected as the first and second elements in an on-state or off-state in each control period.

The power conversion device, based on the control signals generated in this way, operates in a first control mode. When the power conversion device operates in the first control mode, voltage in accordance with the voltage command is output between the first and second output terminals. This output voltage is voltage that is a combination of two levels of voltage among four levels of voltage, those being the voltage of the alternating current power supply, positive voltage and negative voltage of the direct current power supply series circuit, and zero voltage of the neutral point terminal, in each control period. The average value of the output voltage in each control period is equivalent to the voltage command.

When the power conversion device operates in the first control mode, the power conversion device is such that each control period is distributed into one of region 1 to region 7 based on predetermined conditions.

A control period wherein the voltage command is equal to or greater than the zero voltage, and the voltage of the alternating current power supply is equal to or smaller than the zero voltage, belongs to region 1. In this region, the control circuit generates control signals selecting the positive side switching element as the first element and selecting the fourth switch element as the second element. Also, the control circuit generates control signals turning off the negative side switching element and first and second switch elements, and a control signal turning on the third switch element. In this region, the positive voltage of the direct current power supply series circuit and the zero voltage are output.

A control period wherein the voltage command is equal to or greater than the zero voltage, the voltage of the alternating current power supply is greater than the zero voltage, and the voltage command is greater than the voltage of the alternating current power supply, belongs to region 2. In this region, the control circuit generates control signals selecting the positive side switching element as the first element and selecting the second switch element as the second element. Also, the control circuit generates control signals turning off the negative side switching element and third and fourth switch elements, and a control signal turning on the first switch element. In this region, the positive voltage of the direct current power supply series circuit and the voltage of the alternating current power supply are output.

A control period wherein the voltage command is equal to or greater than the zero voltage, the voltage of the alternating current power supply is greater than the zero voltage, and the voltage command is equal to or smaller than the voltage of the alternating current power supply, belongs to region 3. In this region, the control circuit generates control signals selecting the first switch element as the first element and selecting the fourth switch element as the second element. Also, the control circuit generates control signals turning off the positive side and negative side switching elements, and control signals turning on the second and third switch elements. In this region, the voltage of the alternating current power supply and the zero voltage are output.

A control period wherein the voltage command and the voltage of the alternating current power supply are smaller than the zero voltage, which is the potential of the neutral point terminal, and the voltage command is equal to or greater than the voltage of the alternating current power supply, belongs to region 4. In this region, the control circuit generates control signals selecting the second switch element as the first element and selecting the third switch element as the second element. Also, the control circuit generates control signals turning off the positive side and negative side switching elements, and control signals turning on the first and fourth switch elements. In this region, the voltage of the alternating current power supply and the zero voltage are output.

A control period wherein the voltage command and the voltage of the alternating current power supply are smaller than the zero voltage, which is the potential of the neutral point terminal, and the voltage command is smaller than the voltage of the alternating current power supply, belongs to region 5. In this region, the control circuit generates control signals selecting the negative side switching element as the first element and selecting the first switch element as the second element. Also, the control circuit generates control signals turning off the positive side switching element and third and fourth switch elements, and a control signal turning on the second switch element. In this region, the negative voltage of the direct current power supply series circuit and the voltage of the alternating current power supply are output.

A control period wherein the voltage command is smaller than the zero voltage, which is the potential of the neutral point terminal, and the voltage of the alternating current power supply is equal to or greater than the zero voltage, belongs to region 6. In this region, the control circuit generates control signals selecting the negative side switching element as the first element and selecting the third switch element as the second element. Also, the control circuit generates control signals turning off the positive side switching element and first and second switch elements, and a control signal turning on the fourth switch element. In this region, the negative voltage of the direct current power supply series circuit and the zero voltage are output.

A control period wherein the deviation between the voltage command and the voltage of the alternating current power supply is within a range specified in advance belongs to region 7. This region is selected in preference to region 1 to region 6. In this region, the control circuit generates control signals turning on the first bidirectional switch (first and second switch elements) and turning off the positive side and negative side switching elements and third and fourth switch elements. In this region, the voltage of the alternating current power supply is output.

The power conversion device operates in region 7 when the alternating current power supply is sound, and operates in one region of region 1 to region 6 when trouble occurs in the alternating current power supply. Movement between regions is carried out in accordance with the same logical process, which is based on the relationship between the sizes of the voltage command and voltage of the alternating current power supply. Consequently, the power conversion device is such that there is no need to detect an interruption of the alternating current power supply. Also, as the output voltage of the power conversion device is maintained at a voltage corresponding to the voltage command even when there is movement between regions, there is no occurrence of output voltage disturbance.

Also, the power conversion device is such that it is possible for the voltage applied to the two ends of the switching elements and bidirectional switches to be a voltage lower than the voltage across the direct current power supply series circuit. As a result of this, the power conversion device is such that switching loss in the switching elements and bidirectional switches can be reduced.

Also, the power conversion device is such that a path can be configured in every control period, including an idle period, for current flowing through a reactor included in a filter circuit or load. Specifically, by the switch element connected in anti-parallel to the switch element selected as the first or second element being kept constantly in an on-state, it is possible to suppress surge voltage caused by the path of the current flowing through the reactor being shut off.

Also, the power conversion device is such that the voltage command is synchronized with the voltage of the alternating current power supply, and the voltage cycle of the alternating current power supply is divided into a first period, a second period, and a third period. The first period is a period wherein the voltage of the alternating current power supply is equal to or greater than a first reference voltage. The second period is a period wherein the voltage of the alternating current power supply is equal to or smaller than a second reference voltage lower than the first reference voltage. The third period is a period wherein the voltage of the alternating current power supply is between the first reference voltage and second reference voltage. Furthermore, the power conversion device operates in the first control mode when in the first period or second period. When in the third period, the power conversion device operates in a second control mode wherein the first bidirectional switch (first and second switch elements) is turned on, and the other elements are all turned off.

When the power conversion device operates in the second control mode, the current flowing through the load passes through only one switch element of the first bidirectional switch. Also, none of the elements carries out an on-off operation. Also, the power conversion device is such that the first reference voltage is a voltage higher than the zero voltage, and the second reference voltage is a voltage lower than the zero voltage. Because of this, the power conversion device is such that false determination of the region in the vicinity of the zero crossing of the alternating current power supply voltage is prevented. As a result of this, the power conversion device is such that it is possible to suppress surge voltage caused by the path of the current flowing through the reactor being shut off.

Also, switching from the first control mode to the second control mode is carried out when the first and second switch elements are simultaneously in an on-state. By so doing, the power conversion device is such that there is no need to provide an idle period when switching from the first to the second control mode.

Advantageous Effects of Invention

According to the invention, it is possible to output an alternating current voltage in accordance with a voltage command, without detecting an interruption of an alternating current power supply. Also, according to the invention, it is possible to reduce power loss in a power conversion device. Also, according to the invention, it is possible to suppress surge voltage occurring in an inductive element connected to an inverter output.

BRIEF DESCRIPTION OF THE DRAWINGS

FIG. 2 is a diagram for illustrating an embodiment of a bidirectional switch.

FIG. 4 is a diagram for illustrating control signals of each element in each region.

FIG. 11 is a diagram for illustrating control signals of each element in each region.

DETAILED DESCRIPTION

Hereafter, using FIG. 1 to FIG. 16, a description will be given of embodiments of a power conversion device according to the invention.

Figure 1:
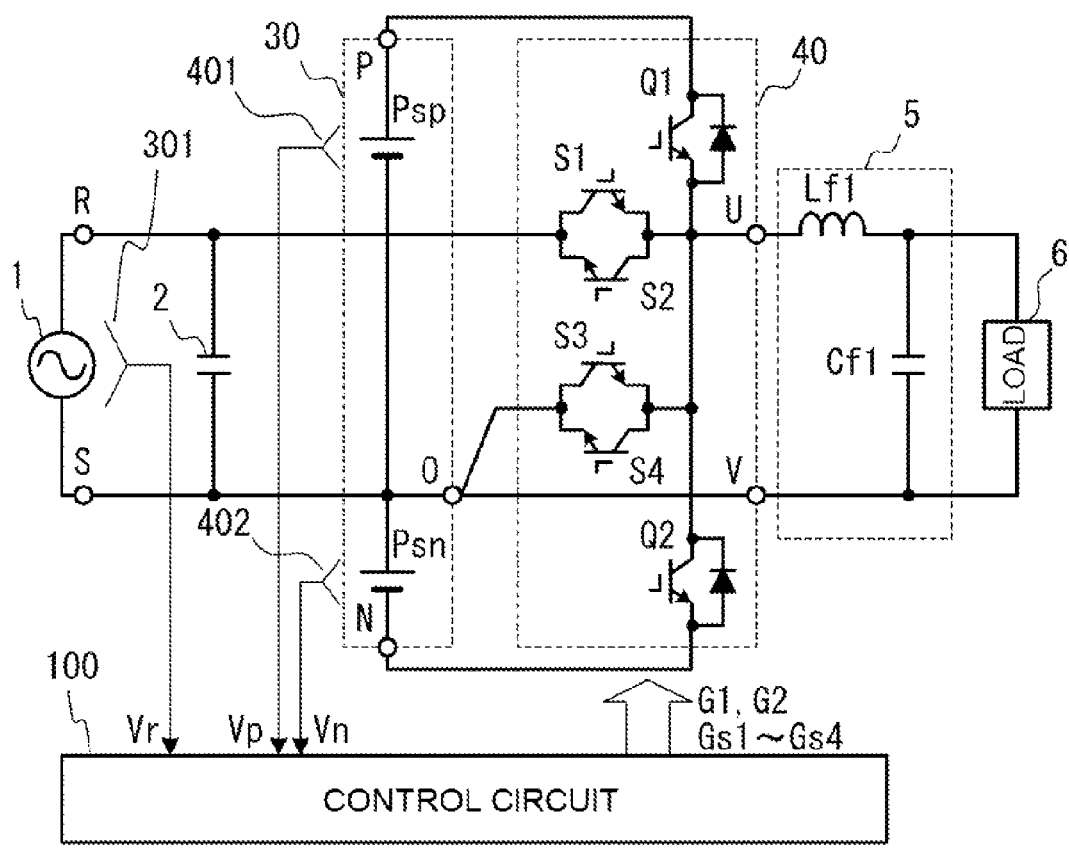
FIG. 1 is a diagram for illustrating an embodiment of the invention.

FIG. 1 is a diagram for illustrating an embodiment of a power conversion device according to the invention. In the diagram, 1 is an alternating current power supply, 2 is a capacitor, 30 is a direct current power supply series circuit, 40 is an inverter circuit, 5 is a filter circuit, 6 is a load, and 100 is a control circuit. The alternating current power supply 1 is a single phase alternating current power supply having a terminal R and a terminal S. The capacitor 2 is connected between the terminal R and terminal S of the alternating current power supply 1.

The direct current power supply series circuit 30 is a direct current power supply formed of a positive side direct current power supply Psp (first direct current power supply) and a negative side direct current power supply Psn (second direct current power supply) connected in series. A positive side terminal P of the direct current power supply series circuit 30 outputs a positive voltage Vp of the direct current power supply Psp. A negative side terminal N of the direct current power supply series circuit 30 outputs a negative voltage Vn of the direct current power supply Psn. A neutral point terminal O of the direct current power supply series circuit 30 outputs a neutral point voltage (zero voltage Vz) of the direct current power supply series circuit 30. The direct current power supply series circuit 30 can be realized by the converter circuit 3 shown in FIG. 17, or by a circuit having equivalent functions.

The terminal S of the alternating current power supply 1 is connected to the neutral point terminal O of the direct current power supply series circuit 30. The terminal R of the alternating current power supply 1 outputs a voltage Vr of the alternating current power supply 1.

The inverter circuit 40 outputs a single phase alternating current voltage using four levels of voltage, those being the positive voltage Vp, negative voltage Vn, zero voltage Vz, and voltage Vr. The configuration and operation of the inverter circuit 40 are as follows.

The inverter circuit 40 is configured of a switching element series circuit and first and second bidirectional switches. The switching element series circuit is a circuit wherein switching elements Q1 and Q2 are connected in series. The first bidirectional switch is a circuit wherein switch elements S1 and S2 are connected in anti-parallel. The second bidirectional switch is a circuit wherein switch elements S3 and S4 are connected in anti-parallel.

The switching element series circuit is connected between the positive side terminal P and negative side terminal N of the direct current power supply series circuit 30. A series connection point of the switching elements Q1 and Q2 is connected to an output terminal U (first output terminal). An output terminal V (second output terminal) is connected to the neutral point terminal O.

The first bidirectional switch is connected between the output terminal U and terminal R. The second bidirectional switch is connected between the output terminal U and neutral point terminal O. Specifically, the collector terminal side of the switch element S1 of the first bidirectional switch is connected to the terminal R, while the emitter terminal side of the switch element S1 is connected to the output terminal U. Also, the collector terminal side of the switch element S4 of the second bidirectional switch is connected to the output terminal U, while the emitter terminal side of the switch element S4 is connected to the neutral point terminal O.

The output terminals U and V are connected via the filter circuit 5 to the load 6. The filter circuit 5 is configured of a series circuit of a reactor Lf1 and capacitor Cf1. The load 6 is connected to both ends of the capacitor Cf1.

Herein, the switching elements Q1 and Q2 are IGBTs (Insulated Gate Bipolar Transistors) wherein diodes are connected in anti-parallel. However, the switching elements Q1 and Q2 are not limited to this kind of configuration. The switching elements Q1 and Q2 may also be configured using another semiconductor element, such as a MOSFET (Metal Oxide Semiconductor Field Effect Transistor), that can carry out an on-off operation at a frequency sufficiently high with respect to the frequency of the alternating current power supply 1.

Also, the first and second bidirectional switches are circuits configured by two reverse blocking IGBTs being connected in anti-parallel. The bidirectional switches can cause current to flow in one direction by one switch element being turned on, and can cause current to flow in the other direction by the other switch element being turned on. Also, the bidirectional switches can cause current to flow in both directions by both switch elements being turned on.

The bidirectional switches may be circuits formed of the configurations shown in FIG. 2(a) to FIG. 2(c), or may be circuits having equivalent functions and advantages. FIG.

2(a) is a circuit in which two circuits wherein an IGBT that does not have reverse blocking voltage withstand and a diode are connected in series are connected in anti-parallel. FIG. 2(b) is a circuit configured by two circuits wherein a diode is connected in anti-parallel to an IGBT that does not have reverse blocking voltage withstand being connected in anti-series. FIG. 2(c) is a circuit configured by the IGBTs being replaced with MOSFETs in the circuit of FIG. 2(b).

The configuration of the inverter circuit 40 is such that the positive voltage Vp of the direct current power supply series circuit 30 is output to the output terminal U by the switching element Q1 being turned on. The negative voltage Vn of the direct current power supply series circuit 30 is output to the output terminal U by the switching element Q2 being turned on. The voltage Vr of the alternating current power supply 1 is output to the output terminal U by either or both of the switch elements S1 and S2 being turned on. The zero voltage Vz of the neutral point terminal O is output to the output terminal U by either or both of the switch elements S3 and S4 being turned on.

As will be described hereafter, the inverter circuit 40 causes the switching elements Q1 and Q2 and switch elements S1 to S4 to carry out on-off operations based on control signals generated in the control circuit 100. Using the on-off operations, the inverter circuit 40 outputs a voltage Vu between the output terminal U and output terminal V (between the output terminals U and V) in response to a voltage command Vu*. The voltage command Vu* is a voltage command including the frequency and amplitude of the alternating current voltage to be supplied to the load 6.

The voltage Vu output from the inverter circuit 40 is pulse width modulated, and includes a large number of harmonic components. The alternating current voltage Vu output from the inverter circuit 40 is supplied to the load 6 after the harmonic components are removed by the filter circuit 5.

A voltage detector 301 detects the voltage Vr of the alternating current power supply 1. A voltage detector 401 detects the positive voltage Vp of the direct current power supply series circuit 30. A voltage detector 402 detects the negative voltage Vn of the direct current power supply series circuit 30. The voltage Vr, positive voltage Vp, and negative voltage Vn detected are input into the control circuit 100.

The control circuit 100 generates control signals G1 and G2 and Gs1 to Gs4 in order to cause the switching elements Q1 and Q2 and switch elements S1 to S4 to carry out on-off operations. Each of the control signals is generated in each control period based on the voltage Vr, positive voltage Vp, negative voltage Vn, and zero voltage Vz. A control period is a period corresponding to the cycle of a carrier signal Sc, to be described hereafter.

It is desirable that the on-off frequency (switching frequency) of each element specified in accordance with the control period is a frequency sufficiently high with respect to the frequency of the voltage command. For example, when the frequency of the voltage command is a commercial frequency, it is preferable that the switching frequency is 1 kHz or higher. Also, it not being essential that the control cycle is synchronous with the voltage command, the control cycle may be asynchronous.

Operations of the control circuit 100 generating the control signals will be described using FIG. 3. A control mode determination circuit 118 is a circuit necessary when dividing the voltage cycle of the alternating current power supply 1 into three periods, those being periods 1 to 3. An operation of the power conversion device when using this circuit will be described hereafter.

Firstly, the voltage Vr detected by the voltage detector 301 is input into a voltage command generator circuit 111. The voltage command generator circuit 111 generates the voltage command Vu* based on the voltage Vr. The voltage command Vu* generated is input together with the voltage Vr into a voltage determination circuit 112. The voltage command Vu* is a voltage command, synchronous with the voltage Vr, that has an amplitude equivalent to that of the rated voltage of the alternating current power supply 1.

The voltage command Vu* can also be a voltage command that is asynchronous with the voltage Vr. Also, the voltage command Vu* can also be a voltage command that has an amplitude differing from that of the rated voltage of the alternating current power supply 1.

The voltage determination circuit 112, using the voltage Vr and voltage command Vu*, outputs a region signal δ to which the relevant control period belongs. The region signal δ is categorized into region 1 to region 6.

A pulse width command selection circuit 113 takes in the voltage command Vu*, voltage Vr, positive voltage Vp, negative voltage Vn, and region signal δ, and generates a pulse width command α. The pulse width command α is the proportion of the control period for which an H arm element, to be described hereafter, is in an on-state.

A comparator 114 compares the pulse width command α and the carrier signal Sc, which is output from a carrier signal generator circuit 116, and generates a control signal Hon of the H arm element (first element). The control signal Hon is a signal that, in the relevant control period, is at "H" for a specified period corresponding to the pulse width command α, and subsequently switches to "L".

A logic inverter 117 inverts the logic of the control signal Hon, thereby generating a control signal Lon of an L arm element (second element).

A pulse distribution circuit 115 takes in the control signals Hon and Lon and the region signal δ. Based on these signals, the pulse distribution circuit 115 generates the control signals G1 and G2 and Gs1 to Gs4 of the switching elements Q1 and Q2 and switch elements S1 to S4. A description will be given hereafter of which elements the control signals Hon and Lon are distributed to.

Next, a description will be given, using FIG. 4, of the relationship between the region signal δ generated by the voltage determination circuit 112 and the pulse width command α generated by the pulse width command selection circuit 113 and control signals generated by the pulse distribution circuit 115.

In the drawing, a "Voltage Command (Vu*)" column, an "Alternating Current Power Supply Voltage (Vr)" column, and a "Vr and Vu* Comparison" column indicate conditions of a region determination carried out by the voltage determination circuit 112. A "δ (Region)" column indicates the region determined from the conditions. An "α (Pulse Width Command)" column indicates the formula for computing the pulse width command α generated by the pulse width command selection circuit 113. A "Control Signal" column indicates the status of the control signals G1 and G2 and Gs1 to Gs4 of the switching elements Q1 and Q2 and switch elements S1 to S4.

When the relationship between the voltage command Vu* and voltage Vr is such that Vu*≥Vz and Vr≤Vz, the voltage determination circuit 112 determines that the relevant control period is in region 1.

When the relationship between the voltage command Vu* and voltage Vr is such that Vu*≥Vz, Vr>Vz, and Vu*>Vr, the voltage determination circuit 112 determines that the relevant control period is in region 2.

When the relationship between the voltage command Vu* and voltage Vr is such that Vu*≥Vz, Vr>Vz, and Vu*≤Vr, the voltage determination circuit 112 determines that the relevant control period is in region 3.

When the relationship between the voltage command Vu* and voltage Vr is such that Vu*<Vz, Vr<Vz, and Vu*≥Vr, the voltage determination circuit 112 determines that the relevant control period is in region 4.

When the relationship between the voltage command Vu* and voltage Vr is such that Vu*<Vz, Vr<Vz, and Vu*<Vr, the voltage determination circuit 112 determines that the relevant control period is in region 5.

When the relationship between the voltage command Vu* and voltage Vr is such that Vu*<Vz and Vr≥Vz, the voltage determination circuit 112 determines that the relevant control period is in region 6.

Also, the pulse width command α in each region is calculated using the following Expressions (1) to (6).

[Math. 1]

$$\text{Pulse width command } \alpha \text{ of region } 1 \alpha = Vu^*/Vp \qquad (1)$$

$$\text{Pulse width command } \alpha \text{ of region } 2 \alpha = (Vu^* - Vr)/(Vp - Vr) \qquad (2)$$

$$\text{Pulse width command } \alpha \text{ of region } 3 \alpha = Vu^*/Vr \qquad (3)$$

$$\text{Pulse width command } \alpha \text{ of region } 4 \alpha = Vu^*/Vr \qquad (4)$$

$$\text{Pulse width command } \alpha \text{ of region } 5 \alpha = (Vu^* - Vr)/(Vn - Vr) \qquad (5)$$

$$\text{Pulse width command } \alpha \text{ of region } 6 \alpha = Vu^*/Vn \qquad (6)$$

Herein, the elements selected as the H arm element and L arm element in each of regions 1 to 6 are specified in advance. In FIG. 4, the control signal of the element functioning as the H arm element in each region is shown as "Hon", and the control signal of the element functioning as the L arm element is shown as "Lon". The H arm element is turned on when the control signal Hon is at "H", and turned off when the control signal Hon is at "L". Also, the L arm element is turned on when the control signal Lon is at "H", and turned off when the control signal Lon is at "L".

However, the H arm element maintains an off-state for an idle period Td from the control signal Hon switching to "H", and is then turned on. Also, the L arm element maintains an off-state for the idle period Td from the control signal Lon switching to "H", and is then turned on. The idle period Td is a period provided in order to prevent the H arm element and L arm element from being turned on simultaneously.

Also, the elements selected as on-state arm elements and off-state arm elements in each of regions 1 to 6 are also specified in advance. In FIG. 4, the control signal of elements functioning as on-state arm elements is shown as "H", and the control signal of elements functioning as off-state arm elements is shown as "L". The on-state arm elements are constantly in an on-state in the relevant control period. The off-state arm elements are constantly in an off-state in the relevant control period.

Next, a description will be given, referring to FIG. 1 and FIG. 5, of an operation of the inverter circuit 40 when the relevant control period is in region 1.

In region 1, the switching element Q1 is selected as the H arm element, and the switch element S4 is selected as the L arm element. Also, the switch element S3 is selected as the on-state arm element, and the switching element Q2 and switch elements S1 and S2 are selected as the off-state arm elements. Consequently, the control signal G1 in region 1 of FIG. 4 is "Hon", and the control signal Gs4 is "Lon". Also, the control signal Gs3 is at "H", and the control signals G2, Gs1, and Gs2 are at "L".

Figure 5:
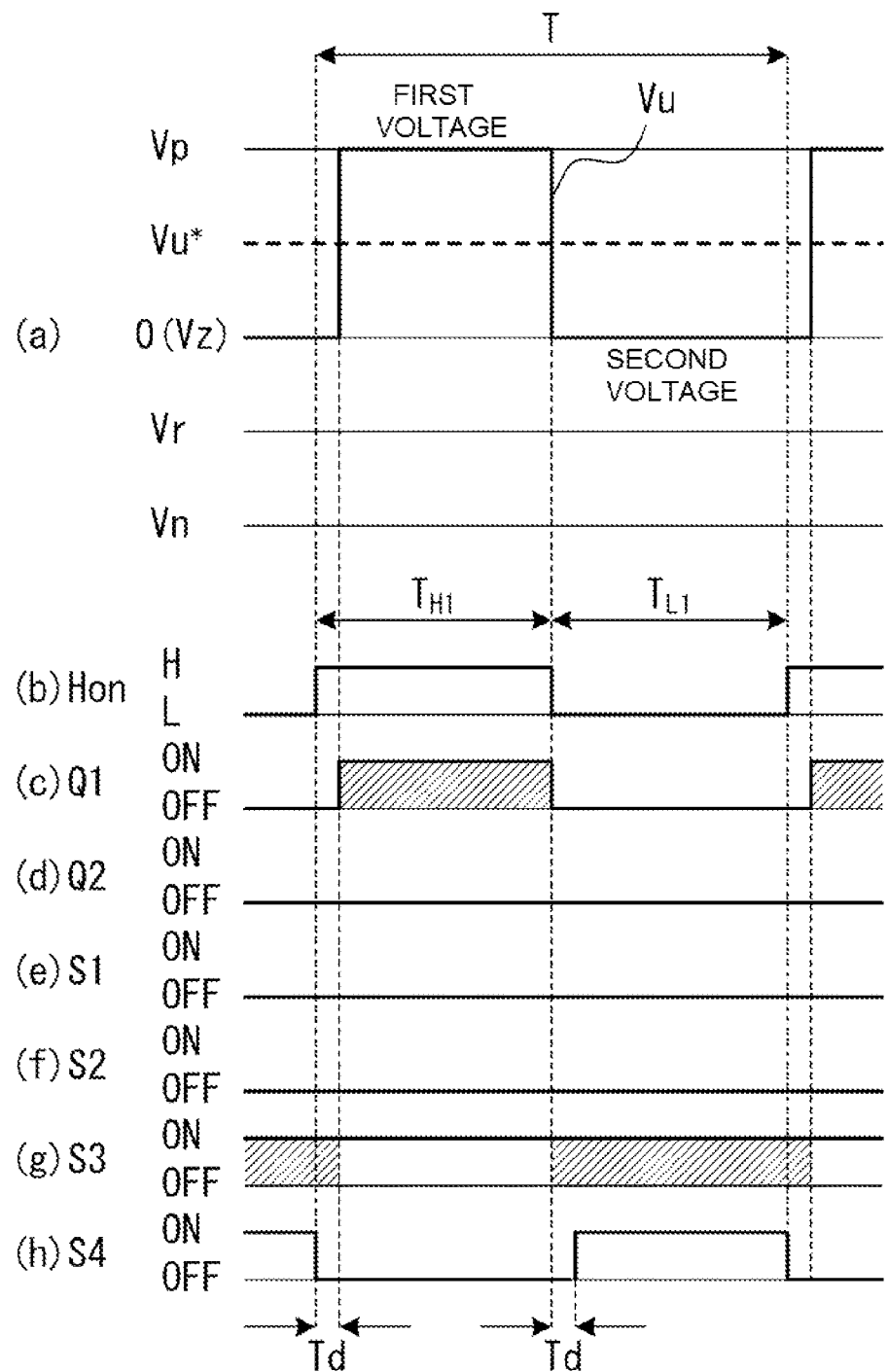
FIG. 5 is a diagram for illustrating an alternating current output voltage in region 1.

FIG. 5(*b*) shows the control signal "Hon" of the H arm element in the relevant control period. FIGS. 5(*c*) to (*h*) show the on-state and off-state of each of the switching elements Q1 and Q2 and switch elements S1 to S4 when the elements operate based on the control signals.

In the control period of region 1, the voltage Vu shown in FIG. 5(*a*) is output between the output terminals U and V. The voltage Vu becomes the positive voltage Vp (first voltage) after the idle period Td from the start point of the relevant control period elapses, and switches to the zero voltage Vz (second voltage) after a time $T_{H1}$ elapses. The time $T_{H1}$ is a time corresponding to the pulse width command α calculated using Expression (1).

When the time $T_{H1}$ is sufficiently longer than the idle time Td, the time for which the switching element Q1 is in an on-state is approximately equal to the time $T_{H1}$. Consequently, the average value of the voltage Vu output between the output terminals U and V approximately coincides with the average value of the voltage command Vu* in the relevant control period.

A time that is the idle time Td added to the time $T_{H1}$ is a time $T_{H1}'$, and provided that the control signal G1 is generated based on the time $T_{H1}'$, the average value of the voltage Vu can be caused to more closely coincide with the average value of the voltage command Vu*.

When the switching element Q1 is in an on-state in a control period wherein the output current flows with the same polarity as that of the output voltage, the circuit current flows along a path 1*a* from the direct current power supply Psp through the switching element Q1 and filter circuit 5 and load 6 to the direct current power supply Psp. At this time, the positive voltage Vp of the direct current power supply Psp is output between the output terminals U and V. Further, on the switching element Q1 being turned off, the current commutes along a path 1*b* from the filter circuit 5 and load 6 through the output terminal V, switch element S3, and output terminal U to the filter circuit 5 and load 6. At this time, the zero voltage Vz is output between the output terminals U and V. Portions shaded with diagonal lines in FIG. 5(*c*) and FIG. 5(*g*) indicate periods for which the circuit currents of the paths 1*a* and 1*b* are flowing in the relevant elements. In this control period, the circuit current path switches in synchronization with the turning on and off of the switching element Q1.

Also, when the switch element S4 is in an on-state in a control period wherein the output current flows with a polarity differing from that of the output voltage, the circuit current flows along a path 1*b*' from the filter circuit 5 and load 6 through the output terminal U, switch element S4, and output terminal V to the filter circuit 5 and load 6. Further, on the switch element S4 being turned off, the current flows along a path 1*a*' from the filter circuit 5 and load 6 through the diode of the switching element Q1, direct current power supply Psp, and output terminal V to the filter circuit 5 and load 6. In this control period, the circuit current path switches in synchronization with the turning on and off of the switch element S4.

While the relevant control period is in region 1, the inverter circuit 40 repeats the heretofore described operation. Consequently, a path for current flowing through the reactor Lf1 is constantly configured in the relevant control period.

Next, a description will be given, referring to FIG. 1 and FIG. 6, of an operation of the inverter circuit 40 when the relevant control period is in region 2.

In region 2, the switching element Q1 is selected as the H arm element, and the switch element S2 is selected as the L arm element. Also, the switch element S1 is selected as the on-state arm element, and the switching element Q2 and switch elements S3 and S4 are selected as the off-state arm elements. Consequently, the control signal G1 in region 2 of FIG. 4 is "Hon", and the control signal Gs2 is "Lon". Also, the control signal Gs1 is at "H", and the control signals G2, Gs3, and Gs4 are at "L".

Figure 6:
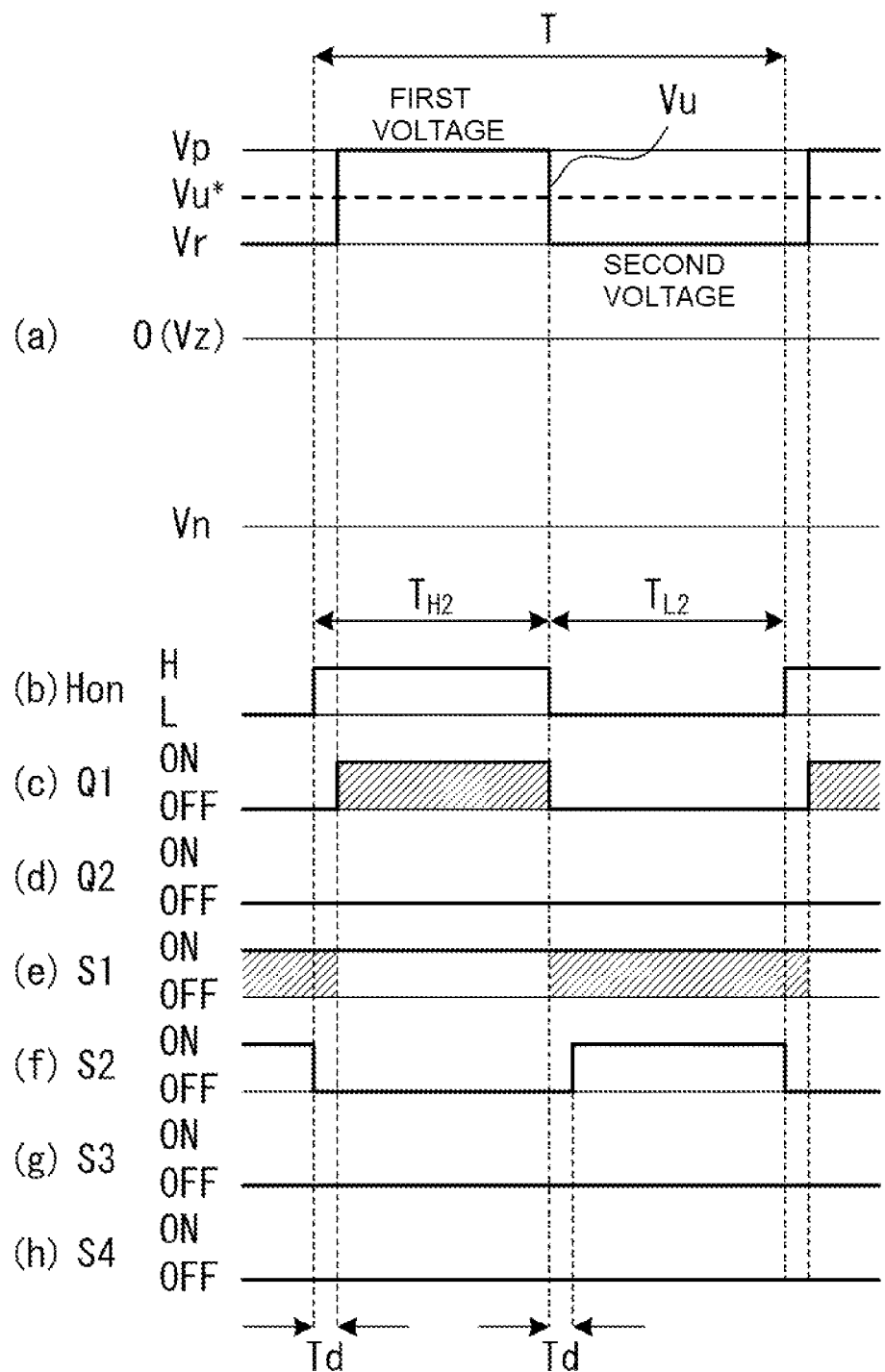
FIG. 6 is a diagram for illustrating an alternating current output voltage in region 2.

FIG. 6(b) shows the control signal "Hon" of the H arm element in the relevant control period. FIGS. 6 (c) to (h) show the on-state and off-state of each of the switching elements Q1 and Q2 and switch elements S1 to S4 when the elements operate based on the control signals.

In the control period of region 2, the voltage Vu shown in FIG. 6(a) is output between the output terminals U and V. The voltage Vu becomes the positive voltage Vp (first voltage) after the idle period Td from the start point of the relevant control period elapses, and switches to the voltage Vr (second voltage) of the alternating current power supply after a time $T_{H2}$ elapses. The time $T_{H2}$ is a time corresponding to the pulse width command α calculated using Expression (2).

When the time $T_{H2}$ is sufficiently longer than the idle time Td, the time for which the switching element Q1 is in an on-state is approximately equal to the time $T_{H2}$. Consequently, the average value of the voltage Vu output between the output terminals U and V approximately coincides with the average value of the voltage command Vu* in the relevant control period.

A time that is the idle time Td added to the time $T_{H2}$ is a time $T_{H2}'$, and provided that the control signal G1 is generated based on the time $T_{H2}'$, the average value of the voltage Vu can be caused to more closely coincide with the average value of the voltage command Vu*.

When the switching element Q1 is in an on-state in a control period wherein the output current flows with the same polarity as that of the output voltage, the circuit current flows along a path 2a from the direct current power supply Psp through the switching element Q1 and filter circuit 5 and load 6 to the direct current power supply Psp. At this time, the positive voltage Vp of the direct current power supply Psp is output between the output terminals U and V. Further, on the switching element Q1 being turned off, the current commutes along a path 2b from the filter circuit 5 and load 6 through the alternating current power supply 1 and switch element S1 to the filter circuit 5 and load 6. At this time, the voltage Vr of the alternating current power supply 1 is output between the output terminals U and V. Portions shaded with diagonal lines in FIG. 6(c) and FIG. 6(e) indicate periods for which the circuit currents of the paths 2a and 2b are flowing in the relevant elements. In this control period, the circuit current path switches in synchronization with the turning on and off of the switching element Q1.

Also, when the switch element S2 is in an on-state in a control period wherein the output current flows with a polarity differing from that of the output voltage, the circuit current flows along a path 2b' from the filter circuit 5 and load 6 through the output terminal U, switch element S2, and alternating current power supply 1 to the filter circuit 5 and load 6. Further, on the switch element S2 being turned off, the current flows along a path 2a' from the filter circuit 5 and load 6 through the diode of the switching element Q1, direct current power supply Psp, and output terminal V to the filter circuit 5 and load 6. In this control period, the circuit current path switches in synchronization with the turning on and off of the switch element S2.

While the relevant control period is in region 2, the inverter circuit 40 repeats the heretofore described operation. Consequently, a path for current flowing through the reactor Lf1 is constantly configured in the relevant control period.

Next, a description will be given, referring to FIG. 1 and FIG. 7, of an operation of the inverter circuit 40 when the relevant control period is in region 3.

In region 3, the switch element S1 is selected as the H arm element, and the switch element S4 is selected as the L arm element. Also, the switch elements S2 and S3 are selected as the on-state arm elements, and the switching elements Q1 and Q2 are selected as the off-state arm elements. Consequently, the control signal Gs1 in region 3 of FIG. 4 is "Hon", and the control signal Gs4 is "Lon". Also, the control signals Gs2 and Gs3 are at "H", and the control signals G1 and G2 are at "L".

Figure 7:
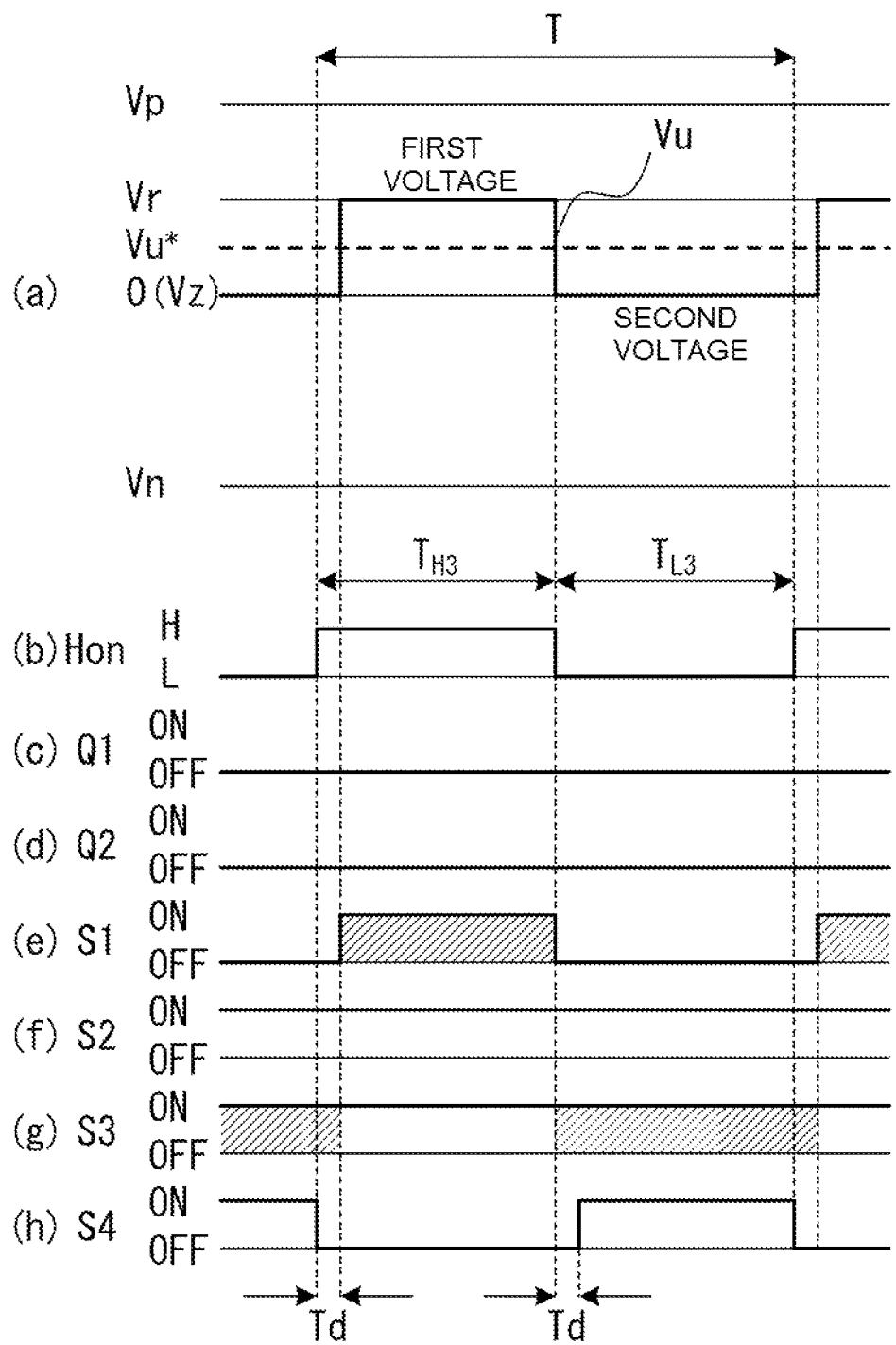
FIG. 7 is a diagram for illustrating an alternating current output voltage in region 3.

FIG. 7(b) shows the control signal "Hon" of the H arm element in the relevant control period. FIGS. 7 (c) to (h) show the on-state and off-state of each of the switching elements Q1 and Q2 and switch elements S1 to S4 when the elements operate based on the control signals.

In the control period of region 3, the voltage Vu shown in FIG. 7(a) is output between the output terminals U and V. The voltage Vu becomes the voltage Vr of the alternating current power supply 1 (first voltage) after the idle period Td from the start point of the relevant control period elapses, and switches to the zero voltage Vz (second voltage) after a time $T_{H3}$ elapses. The time $T_{H3}$ is a time corresponding to the pulse width command α calculated using Expression (3).

When the time $T_{H3}$ is sufficiently longer than the idle time Td, the time for which the switch element S1 is in an on-state is approximately equal to the time $T_{H3}$. Consequently, the average value of the voltage Vu output between the output terminals U and V approximately coincides with the average value of the voltage command Vu* in the relevant control period.

A time that is the idle time Td added to the time $T_{H3}$ is a time $T_{H3}'$, and provided that the control signal Gs1 is generated based on the time $T_{H3}'$, the average value of the voltage Vu can be caused to more closely coincide with the average value of the voltage command Vu*.

When the switch element S1 is in an on-state in a control period wherein the output current flows with the same polarity as that of the output voltage, the circuit current flows along a path 3a from the alternating current power supply 1 through the switch element S1 and filter circuit 5 and load 6 to the alternating current power supply 1. At this time, the voltage Vr of the alternating current power supply 1 is output between the output terminals U and V. Further, on the switch element S1 being turned off, the current commutes along a path 3b from the filter circuit 5 and load 6 through the neutral point terminal O and switch element S3 to the filter circuit 5 and load 6. At this time, the zero voltage Vz is output between the output terminals U and V. Portions shaded with diagonal lines in FIG. 7(e) and FIG. 7(g) indicate periods for which the circuit currents of the paths 3a and 3b are flowing in the relevant elements. In this control period, the circuit current path switches in synchronization with the turning on and off of the switch element S1.

Also, when the switch element S4 is in an on-state in a control period wherein the output current flows with a polarity differing from that of the output voltage, the circuit current flows along a path 3b' from the filter circuit 5 and load 6 through the output terminal U, switch element S4, and output terminal V to the filter circuit 5 and load 6. Further, on the switch element S4 being turned off, the current flows along a path 3a' from the filter circuit 5 and load 6 through the switch element S2 and alternating current power supply 1 to the filter circuit 5 and load 6. In this control period, the circuit current path switches in synchronization with the turning on and off of the switch element S4.

While the relevant control period is in region 3, the inverter circuit 40 repeats the heretofore described operation. Consequently, a path for current flowing through the reactor Lf1 is constantly configured in the relevant control period.

Next, a description will be given, referring to FIG. 1 and FIG. 8, of an operation of the inverter circuit 40 when the relevant control period is in region 4.

In region 4, the switch element S2 is selected as the H arm element, and the switch element S3 is selected as the L arm element. Also, the switch elements S1 and S4 are selected as the on-state arm elements, and the switching elements Q1 and Q2 are selected as the off-state arm elements. Consequently, the control signal G2 in region 4 of FIG. 4 is "Hon", and the control signal G3 is "Lon". Also, the control signals Gs1 and Gs4 are at "H", and the control signals G1 and G2 are at "L".

Figure 8:
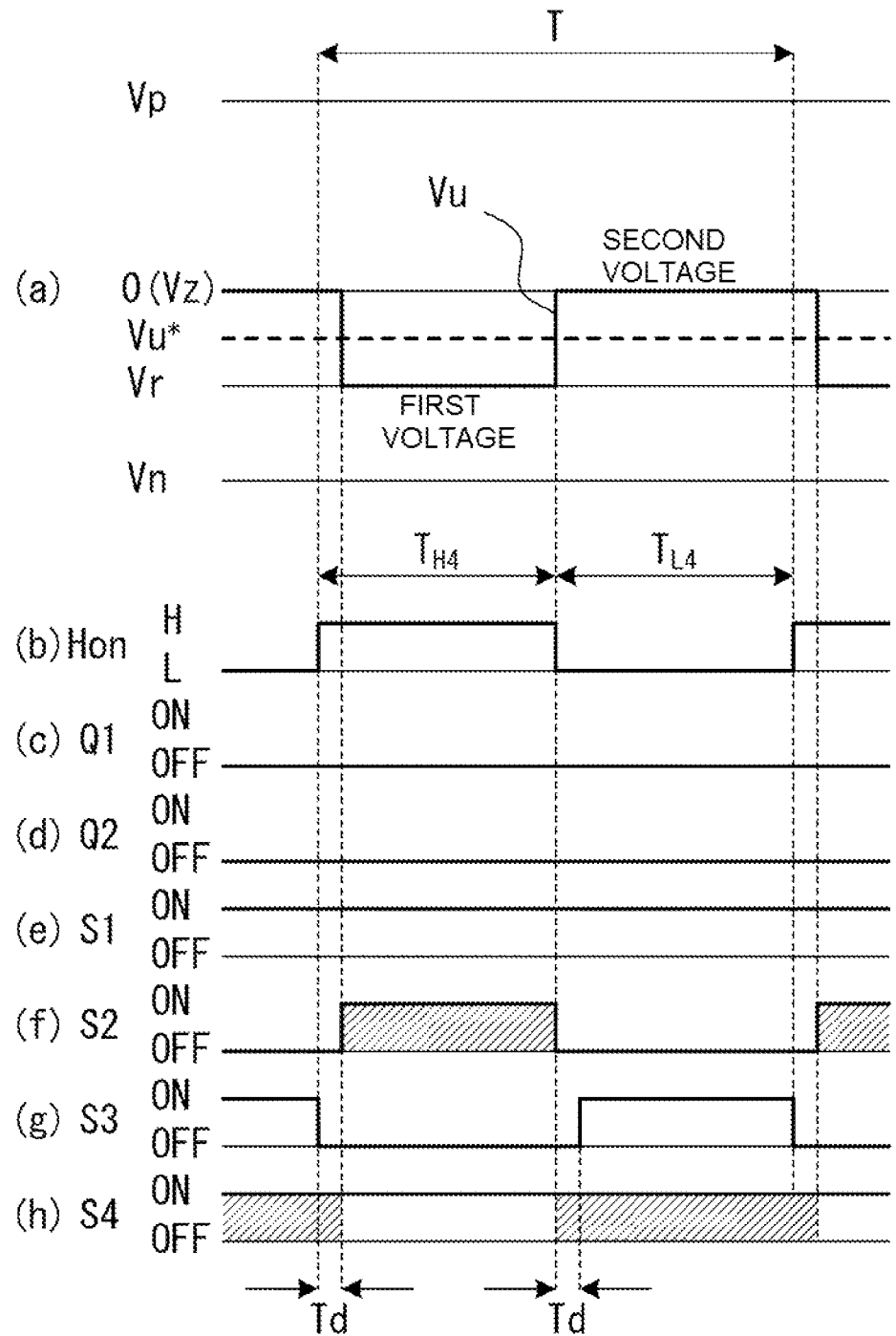
FIG. 8 is a diagram for illustrating an alternating current output voltage in region 4.

FIG. 8(b) shows the control signal "Hon" of the H arm element in the relevant control period. FIGS. 8 (c) to (h) show the on-state and off-state of each of the switching elements Q1 and Q2 and switch elements S1 to S4 when the elements operate based on the control signals.

In the control period of region 4, the voltage Vu shown in FIG. 8 (a) is output between the output terminals U and V. The voltage Vu becomes the voltage Vr of the alternating current power supply 1 (first voltage) after the idle period Td from the start point of the relevant control period elapses, and switches to the zero voltage Vz (second voltage) after a time $T_{H4}$ elapses. The time $T_{H4}$ is a time corresponding to the pulse width command α calculated using Expression (4).

When the time $T_{H4}$ is sufficiently longer than the idle time Td, the time for which the switch element S2 is in an on-state is approximately equal to the time $T_{H4}$. Consequently, the average value of the voltage Vu output between the output terminals U and V approximately coincides with the average value of the voltage command Vu* in the relevant control period.

A time that is the idle time Td added to the time $T_{H4}$ is a time $T_{H4}'$, and provided that the control signal Gs2 is generated based on the time $T_{H4}'$, the average value of the voltage Vu can be caused to more closely coincide with the average value of the voltage command Vu*.

When the switch element S2 is in an on-state in a control period wherein the output current flows with the same polarity as that of the output voltage, the circuit current flows along a path 4a from the alternating current power supply 1 through the output terminal V, filter circuit 5 and load 6, and switch element S2 to the alternating current power supply 1. At this time, the voltage Vr of the alternating current power supply 1 is output between the output terminals U and V. Further, on the switch element S2 being turned off, the current commutes along a path 4b from the filter circuit 5 and load 6 through the output terminal U, switch element S4, and output terminal V to the filter circuit 5 and load 6. At this time, the zero voltage Vz is output between the output terminals U and V. Portions shaded with diagonal lines in FIG. 8(f) and FIG. 8(h) indicate periods for which the circuit currents of the paths 4a and 4b are flowing in the relevant elements. In this control period, the circuit current path switches in synchronization with the turning on and off of the switch element S2.

Also, when the switch element S3 is in an on-state in a control period wherein the output current flows with a polarity differing from that of the output voltage, the circuit current flows along a path 4b' from the filter circuit 5 and load 6 through the output terminal V, switch element S3, and output terminal U to the filter circuit 5 and load 6. Further, on the switch element S3 being turned off, the current flows along a path 4a' from the filter circuit 5 and load 6 through the output terminal V, alternating current power supply 1, and switch element S1 to the filter circuit 5 and load 6. In this control period, the circuit current path switches in synchronization with the turning on and off of the switch element S3.

While the relevant control period is in region 4, the inverter circuit 40 repeats the heretofore described operation. Consequently, a path for current flowing through the reactor Lf1 is constantly configured in the relevant control period.

Next, a description will be given, referring to FIG. 1 and FIG. 9, of an operation of the inverter circuit 40 when the relevant control period is in region 5.

In region 5, the switching element Q2 is selected as the H arm element, and the switch element S1 is selected as the L arm element. Also, the switch element S2 is selected as the on-state arm element, and the switching element Q1 and switch elements S3 and S4 are selected as the off-state arm elements. Consequently, the control signal G2 in region 5 of FIG. 4 is "Hon", and the control signal Gs1 is "Lon". Also, the control signal Gs2 is at "Ti", and the control signals G1, Gs3, and Gs4 are at "L".

Figure 9:
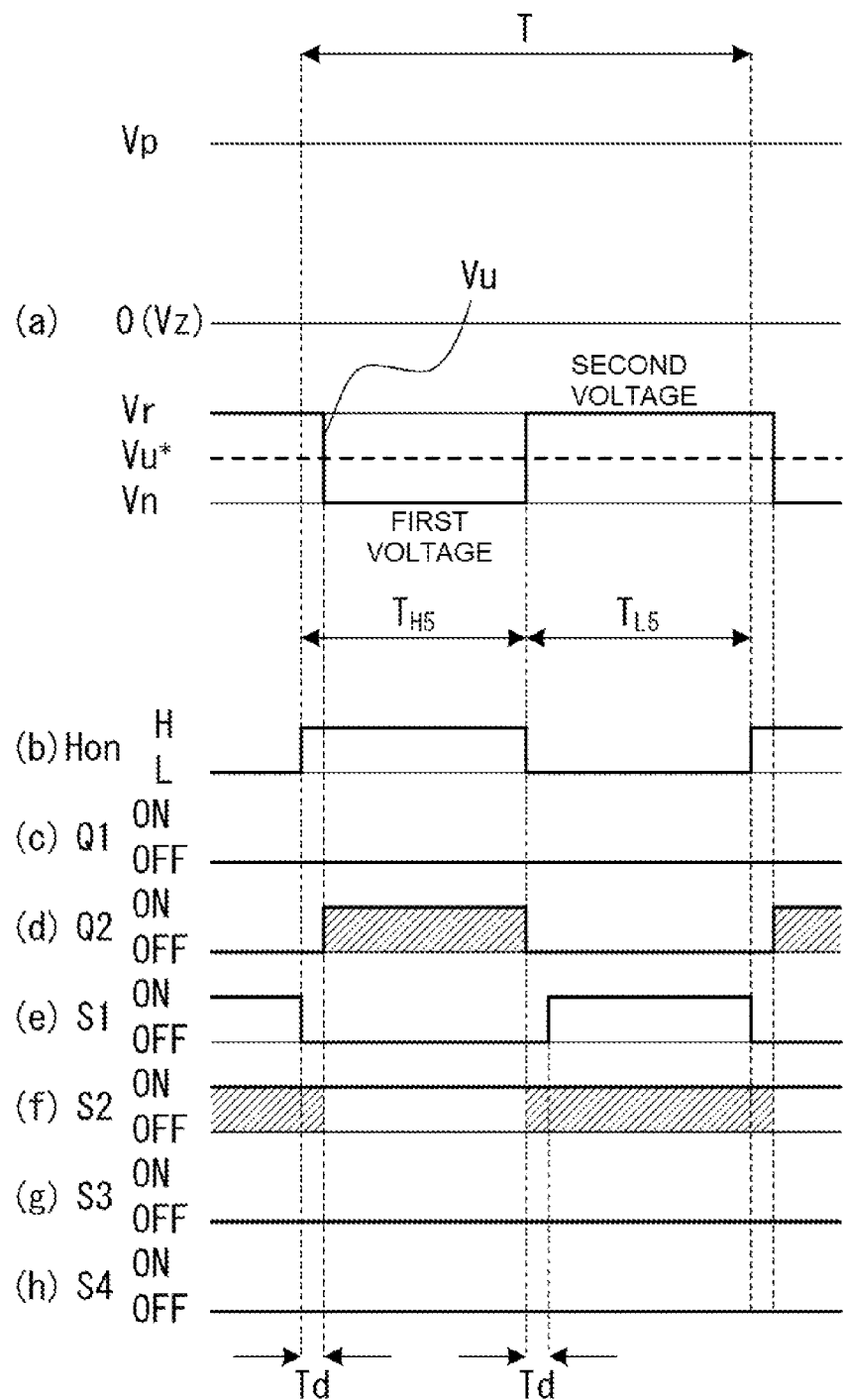
FIG. 9 is a diagram for illustrating an alternating current output voltage in region 5.

FIG. 9(b) shows the control signal "Hon" of the H arm element in the relevant control period. FIGS. 9 (c) to (h) show the on-state and off-state of each of the switching elements Q1 and Q2 and switch elements S1 to S4 when the elements operate based on the control signals.

In the control period of region 5, the voltage Vu shown in FIG. 9(a) is output between the output terminals U and V. The voltage Vu becomes the negative voltage Vn (first voltage) after the idle period Td from the start point of the relevant control period elapses, and switches to the voltage Vr of the alternating current power supply 1 (second voltage) after a time $T_{H5}$ elapses. The time $T_{H5}$ is a time corresponding to the pulse width command α calculated using Expression (5).

When the time $T_{H5}$ is sufficiently longer than the idle time Td, the time for which the switching element Q2 is in an on-state is approximately equal to the time $T_{H5}$. Consequently, the average value of the voltage Vu output between the output terminals U and V approximately coincides with the average value of the voltage command Vu* in the relevant control period.

A time that is the idle time Td added to the time $T_{H5}$ is a time $T_{H5}'$, and provided that the control signal G2 is generated based on the time $T_{H5}'$, the average value of the voltage Vu can be caused to more closely coincide with the average value of the voltage command Vu*.

When the switching element Q2 is in an on-state in a control period wherein the output current flows with the same polarity as that of the output voltage, the circuit current flows along a path 5a from the direct current power supply Psn through the output terminal V, filter circuit 5 and load 6, and switching element Q2 to the direct current power supply Psn. At this time, the negative voltage Vn of the direct current power supply Psn is output between the output terminals U and V. Further, on the switching element Q2 being turned off, the current commutes along a path 5b from the filter circuit 5 and load 6 through the switch element S2 and alternating current power supply 1 to the filter circuit 5 and load 6. At this time, the voltage Vr of the alternating current power supply 1 is output between the output terminals U and V. Portions shaded with diagonal lines in FIG. 9(d) and FIG. 9(f) indicate periods for which the circuit currents of the paths 5a and 5b are flowing in the relevant elements. In this control period, the circuit current path switches in synchronization with the turning on and off of the switching element Q2.

Also, when the switch element S1 is in an on-state in a control period wherein the output current flows with a polarity differing from that of the output voltage, the circuit current flows along a path 5b' from the filter circuit 5 and load 6 through the output terminal V, alternating current power supply 1, and switch element S1 to the filter circuit 5 and load 6. Further, on the switch element S1 being turned off, the current flows along a path 5a' from the filter circuit 5 and load 6 through the output terminal V, direct current power supply Psn, and diode of the switching element Q2 to the filter circuit 5 and load 6. In this control period, the circuit current path switches in synchronization with the turning on and off of the switch element S3.

While the relevant control period is in region 5, the inverter circuit 40 repeats the heretofore described operation. Consequently, a path for current flowing through the reactor Lf1 is constantly configured in the relevant control period.

Next, a description will be given, referring to FIG. 1 and FIG. 10, of an operation of the inverter circuit 40 when the relevant control period is in region 6.

In region 6, the switching element Q2 is selected as the H arm element, and the switch element S3 is selected as the L arm element. Also, the switch element S4 is selected as the on-state arm element, and the switching element Q1 and switch elements S1 and S2 are selected as the off-state arm elements. Consequently, the control signal G2 in region 6 of FIG. 4 is "Hon", and the control signal Gs3 is "Lon". Also, the control signal Gs4 is at "Ti", and the control signals G1, Gs1, and Gs2 are at "L".

FIG. 10(b) shows the control signal "Hon" of the H arm element in the relevant control period. FIGS. 10(c) to (h) show the on-state and off-state of each of the switching elements Q1 and Q2 and switch elements S1 to S4 when the elements operate based on the control signals.

Figure 10:
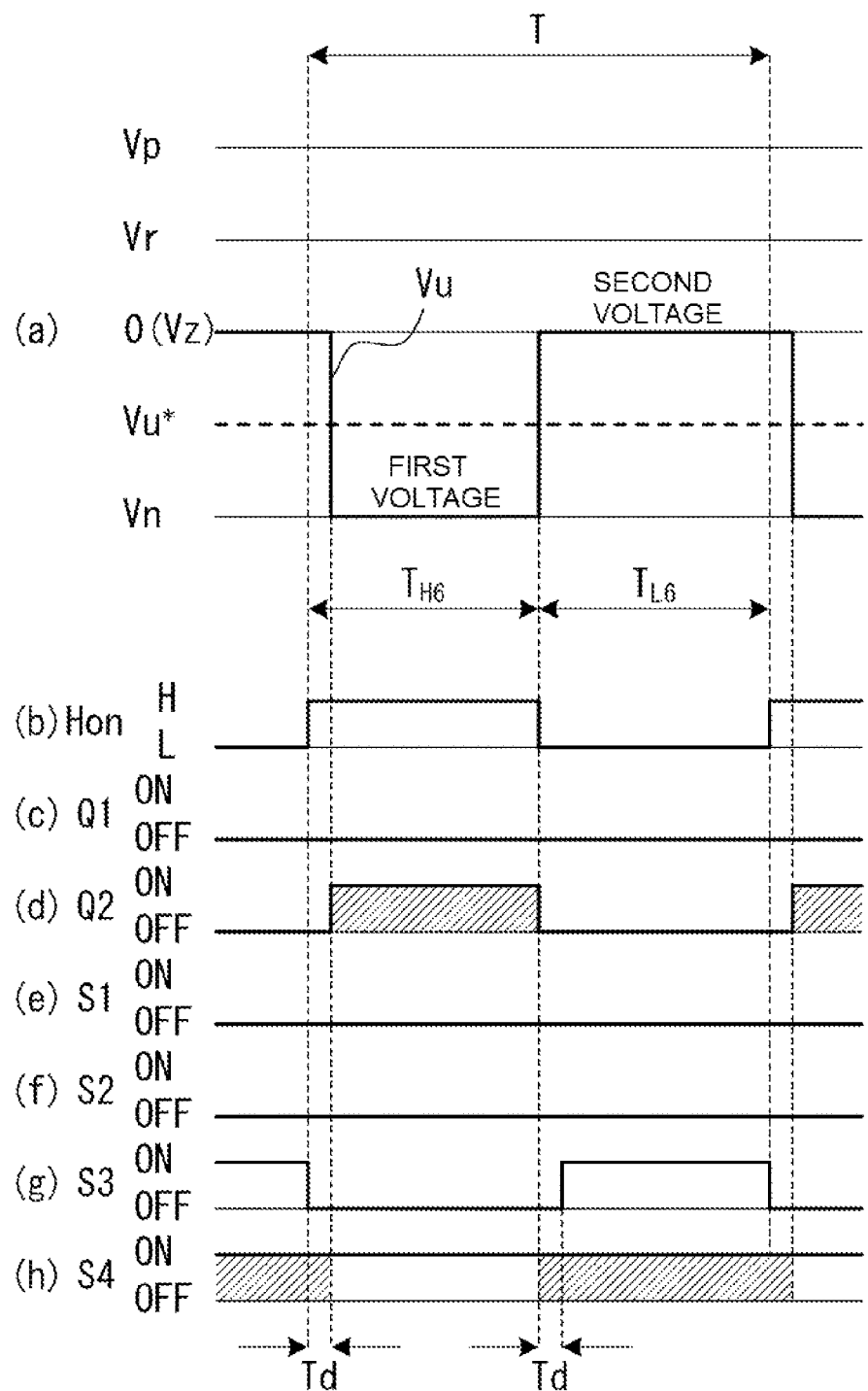
FIG. 10 is a diagram for illustrating an alternating current output voltage in region 6.

In the control period of region 6, the voltage Vu shown in FIG. 10 (a) is output between the output terminals U and V. The voltage Vu becomes the negative voltage Vn (first voltage) after the idle period Td from the start point of the relevant control period elapses, and switches to the zero voltage Vz (second voltage) after a time $T_{H6}$ elapses. The time $T_{H6}$ is a time corresponding to the pulse width command α calculated using Expression (6).

When the time $T_{H6}$ is sufficiently longer than the idle time Td, the time for which the switching element Q2 is in an on-state is approximately equal to the time $T_{H6}$. Consequently, the average value of the voltage Vu output between the output terminals U and V approximately coincides with the average value of the voltage command Vu* in the relevant control period.

A time that is the idle time Td added to the time $T_{H6}$ is a time $T_{H6}'$, and provided that the control signal G2 is generated based on the time $T_{H6}'$, the average value of the voltage Vu can be caused to more closely coincide with the average value of the voltage command Vu*.

When the switching element Q2 is in an on-state in a control period wherein the output current flows with the same polarity as that of the output voltage, the circuit current flows along a path 6a from the direct current power supply Psn through the output terminal V, filter circuit 5 and load 6, and switching element Q2 to the direct current power supply Psn. At this time, the negative voltage Vn of the direct current power supply Psn is output between the output terminals U and V. Further, on the switching element Q2 being turned off, the current commutes along a path 6b from the filter circuit 5 and load 6 through the switch element S4 to the filter circuit 5 and load 6. At this time, the zero voltage Vz is output between the output terminals U and V. Portions shaded with diagonal lines in FIG. 10(d) and FIG. 10(h) indicate periods for which the circuit currents of the paths 6a and 6b are flowing in the relevant elements. In this control period, the circuit current path switches in synchronization with the turning on and off of the switching element Q2.

Also, when the switch element S3 is in an on-state in a control period wherein the output current flows with a polarity differing from that of the output voltage, the circuit current flows along a path 6b' from the filter circuit 5 and load 6 through the output terminal V and switch element S3 to the filter circuit 5 and load 6. Further, on the switch element S3 being turned off, the current flows along a path 6a' from the filter circuit 5 and load 6 through the output terminal V, direct current power supply Psn, and diode of the switching element Q2 to the filter circuit 5 and load 6. In this control period, the circuit current path switches in synchronization with the turning on and off of the switch element S3.

While the relevant control period is in region 6, the inverter circuit 40 repeats the heretofore described operation. Consequently, a path for current flowing through the reactor Lf1 is constantly configured in the relevant control period.

As heretofore described, the power conversion device according to the embodiment is such that the H arm element and L arm element are selected in each control period. Further, the power conversion device is such that the H arm element and L arm element are turned on and off in a complementary way for a pulse width modulated time span within each control period, whereby the voltage Vu is output between the output terminals U and V. The average value of the voltage Vu is equivalent to the voltage command Vu* in each control period. That is, the power conversion device is such that the alternating current voltage Vu corresponding to the voltage command Vu* is supplied to the load 6 using four levels of voltage, those being the voltage Vr of the alternating current power supply 1 and the voltages Vp and Vn and zero voltage Vz of the direct current power supply series circuit 30. For this operation, there is no need for a transformer of commercial frequency for voltage superposition.

In this case, the switching elements Q1 and Q2 and switch elements S1 to S4 carryout on-off operations between the first voltage and second voltage. As is also clear from FIG. 1 and FIG. 5 to FIG. 10, the voltage difference between the first voltage and second voltage is small in comparison with the voltage difference between the positive voltage Vp and negative voltage Vn of the direct current power supply series circuit 30. Consequently, switching loss occurring when the switching elements Q1 and Q2 and switch elements S1 to S4 are turned on and turned off is smaller than the switching loss occurring when turning on and turning off between the positive voltage Vp and negative voltage Vn of the direct current power supply series circuit 30.

Figure 17:
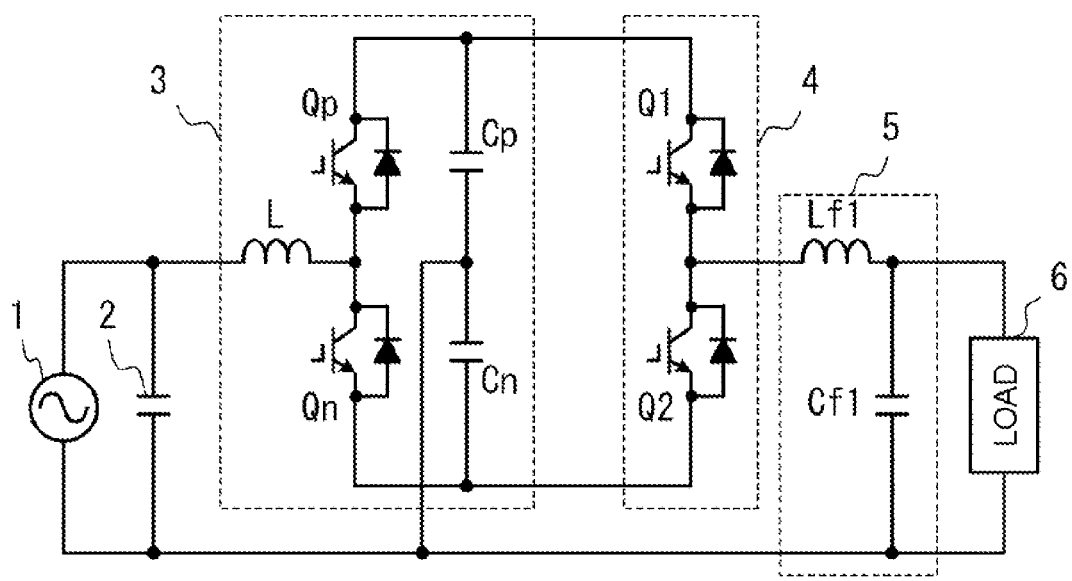
FIG. 17 is a diagram for illustrating a power conversion device according to existing technology.
Figure 18:
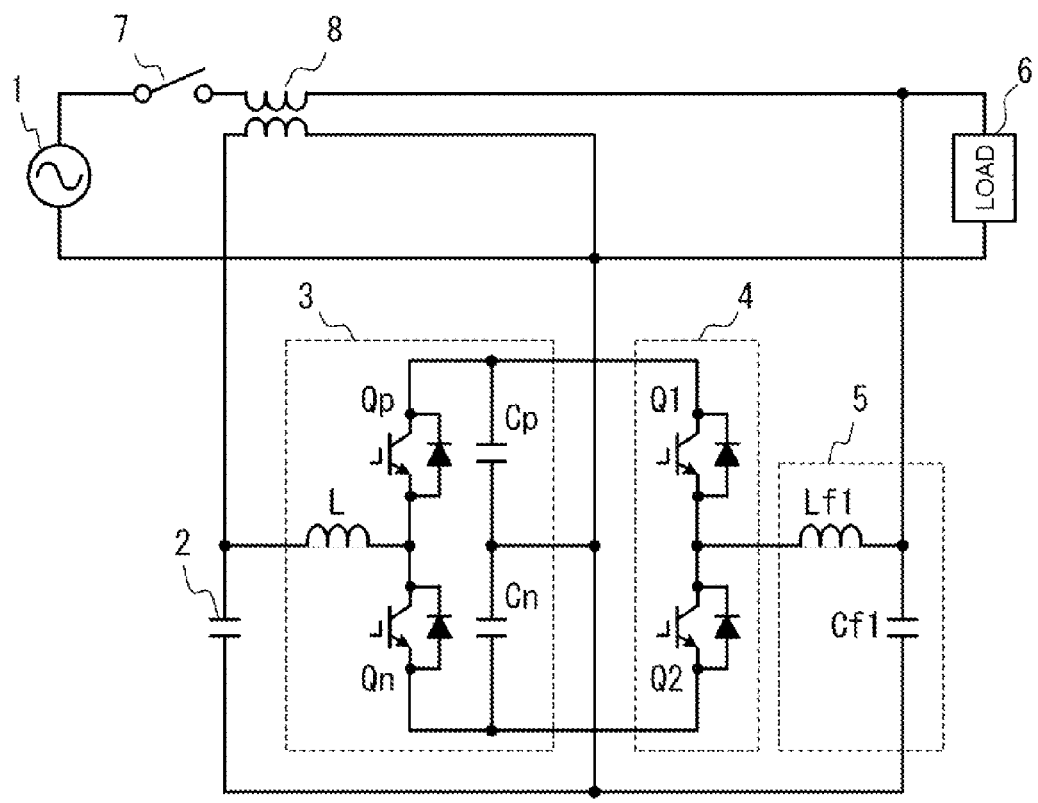
FIG. 18 is a diagram for illustrating a power conversion device according to existing technology.

That is, when the switching frequency of the power conversion device according to the embodiment is the same as the switching frequency of the inverter circuit 4 shown in FIG. 17, the power conversion device is such that power loss can be reduced compared with the inverter circuit 4 shown in FIG. 17.

Also, the alternating current output voltage Vu of the power conversion device according to the embodiment varies between the first voltage and second voltage. Consequently, the voltage applied to the reactor Lf1 decreases.

The ripple current flowing through the reactor Lf1 is proportional to the voltage-time product (voltage variation width×voltage pulse width), and inversely proportional to the inductance value. When the inductance value is the same, the voltage-time product decreases in the power conversion device, because of which the ripple current flowing through the reactor Lf1 decreases. When the ripple current decreases, loss (mainly iron loss) in the reactor Lf1 decreases. Consequently, the power conversion device is such that loss in the reactor Lf1 can be reduced.

Meanwhile, when the ripple current is the same, the power conversion device is such that the inductance value of the reactor Lf1 can be reduced. Consequently, the power conversion device is such that, in this case, the size of the reactor Lf1 can be reduced.

Also, the power conversion device according to the embodiment is such that, when all the switching elements and switch elements are in an off-state, a path can be configured for current flowing through the reactor Lf1. Consequently, the power conversion device is such that it is possible in each control period to suppress the occurrence of surge voltage caused by the inductive energy of the reactor Lf1. Also, the power conversion device is such that it is possible to suppress the occurrence of surge voltage caused by the inductance components of the circuit, even when the load 6 is connected directly between the output terminals U and V.

Herein, the power conversion device according to the embodiment is such that no voltage higher than the positive voltage Vp, and no voltage lower than the negative voltage Vn, of the direct current power supply series circuit 30 can be output. Consequently, when the voltage command Vu* is higher than the positive voltage Vp, and when the voltage command Vu* is lower than the negative voltage Vn, it is appropriate to carry out a protective operation, such as turning off all the elements.

Also, when the voltage command Vu* is higher than the positive voltage Vp, the switching element Q1 may be constantly maintained in an on-state. Further, when the voltage command Vu* is lower than the negative voltage Vn, the switching element Q2 may be constantly maintained in an on-state.

Also, it is preferred that the alternating current output voltage Vu is synchronized with the voltage Vr of the alternating current power supply 1. Provided that the alternating current output voltage Vu is synchronized with the voltage Vr of the alternating current power supply 1, the voltage applied to the switching elements Q1 and Q2 and switch elements S1 to S4 can be further reduced. As a result of this, switching loss occurring in these elements can be further reduced.

Next, a description will be given of an embodiment including, in addition to region 1 to region 6, a region 7 for outputting the voltage of the alternating current power supply 1 between the output terminals U and V.

FIG. 11 is a diagram for illustrating the relationship between the pulse width command α and the on-state and off-state of the elements when the power conversion device shown in FIG. 1 operates in region 7 in addition to the region 1 to region 6 shown in FIG. 4.

Figure 12:
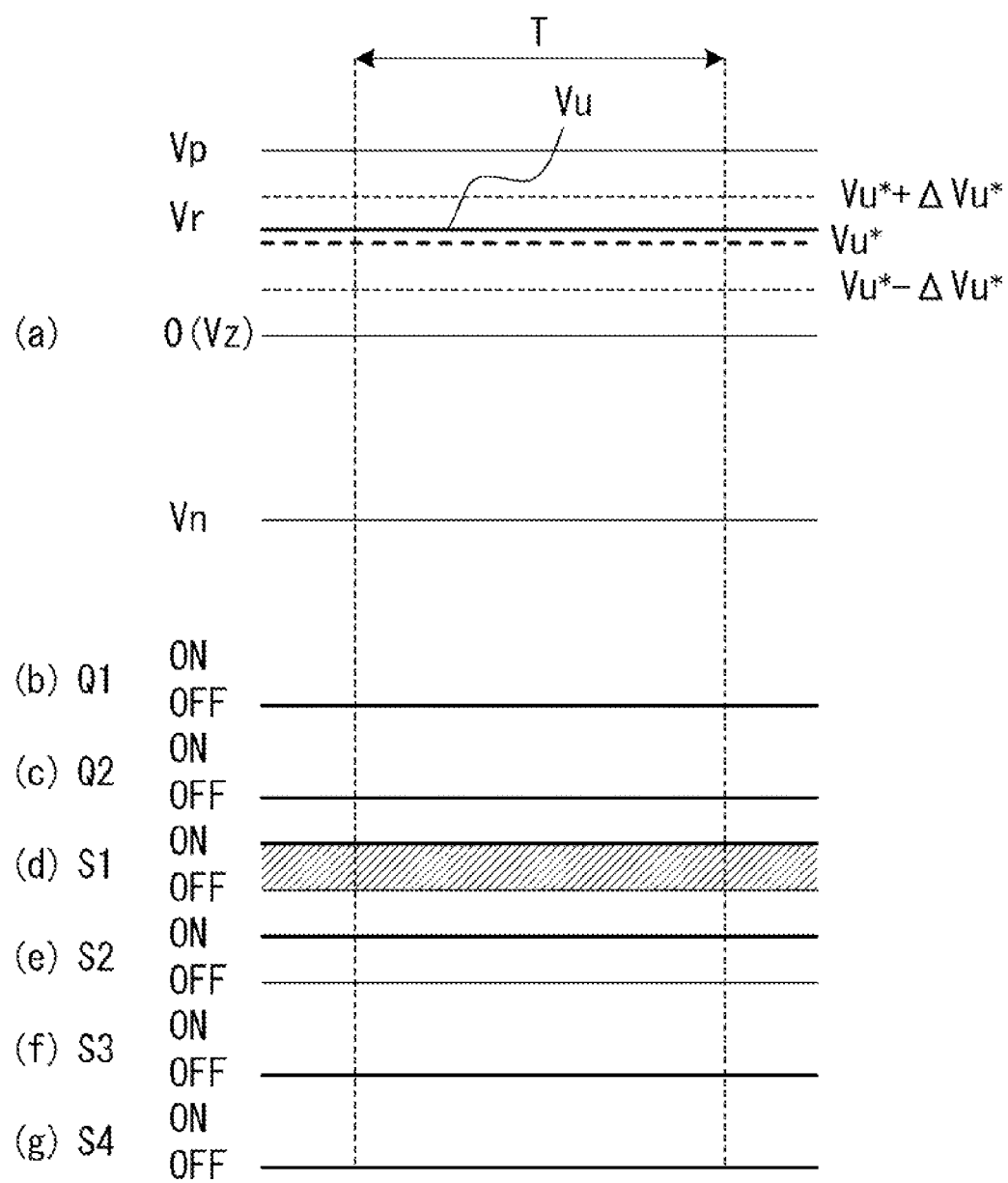
FIG. 12 is a diagram for illustrating an alternating current output voltage in region 7.

FIG. 12 is a diagram for illustrating the output voltage Vu, and operations of the switching elements Q1 and Q2 and switch elements S1 to S4, in region 7 when the voltage Vr of the alternating current power supply 1 has positive polarity. FIG. 12(a) shows the voltage Vu output between the output terminals U and V in the relevant control period. FIGS. 12(b) to (g) show the on-state and off-state of the switching elements Q1 and Q2 and switch elements S1 to S4. The portion shaded with diagonal lines in FIG. 12(d) indicates the period for which the circuit current is flowing in the relevant element.

Figure 3:
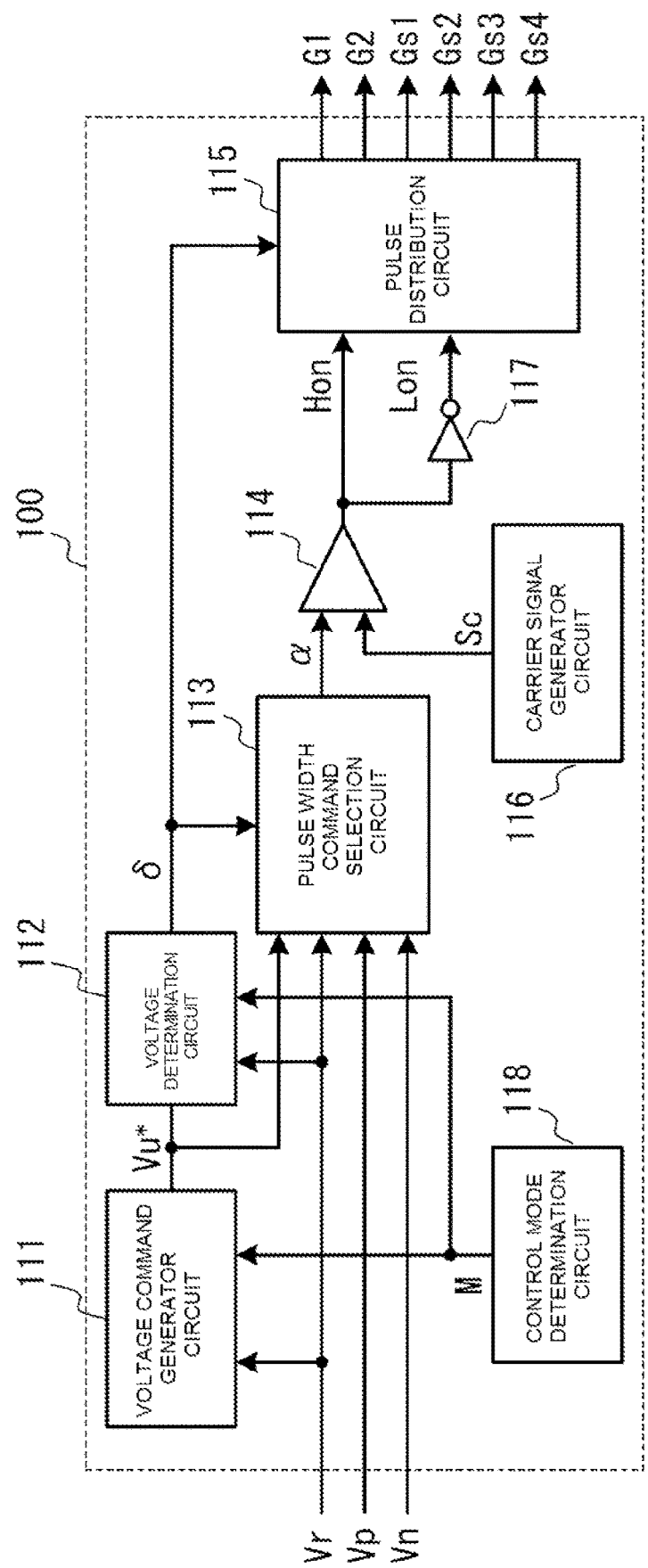
FIG. 3 is a block diagram for illustrating operations of a control circuit.

In this embodiment, the configurations of the power conversion device and control circuit are the same as the configuration of the power conversion device shown in FIG. 1 and the configuration of the control circuit 100 shown in FIG. 3. Also, the operations of the power conversion device in region 1 to region 6 are the same as the heretofore described operations. Consequently, a description of operations that duplicate the description of the operations of region 1 to region 6 will be omitted.

Firstly, in FIG. 3, the detected voltage Vr of the alternating current power supply 1 is input into the voltage command generator circuit 111. The voltage command generator circuit 111 generates the voltage command Vu* based on the input voltage Vr. The voltage command Vu* generated is input together with the voltage Vr into the voltage determination circuit 112.

When the relationship between the voltage command Vu* and voltage Vr satisfies the condition |Vu*−Vr|<ΔVu*, the voltage determination circuit 112 determines that the relevant control period is in region 7. Then, the voltage determination circuit 112 outputs the region signal δ indicating region 7.

Herein, ΔVu* is a reference variable for determining that the value of the voltage Vr of the alternating current power supply 1 is within a predetermined range with respect to the value of the voltage command Vu*. When the load 6 allows variation of the input voltage within a range of the voltage command Vu*±10%, the reference variable ΔVu* is a variable corresponding to 10% of the voltage command Vu*. The reference variable ΔVu* may also be a variable specified in accordance with another condition.

On the region signal δ indicating region 7 being input, the pulse width command selection circuit 113 fixes the pulse width command α at 1.0. When the pulse width command α is 1.0, the comparator 114 generates the control signal Hon causing the H arm element to be turned on throughout the relevant control period, regardless of the size of the carrier signal Sc. That is, the control signal Hon of the H arm element is constantly at a high level in the relevant control period, while the control signal Lon of the L arm element is constantly at a low level.

When the relevant control period is in region 7, the switch elements S1 and S2 are selected as the on-state arm elements. Also, the switching elements Q1 and Q2 and switch elements S3 and S4 are selected as the off-state arm elements. That is, when the region signal δ indicating region 7 is output from the voltage determination circuit 112, the H arm element and L arm element are not selected. Consequently, the control signals Gs1 and Gs2 in region 7 of FIG. 11 are at "Ti". Also, the control signals G1 and G2 and control signals Gs3 and Gs4 are at "L".

When the inverter circuit 40 operates based on the control signals, the voltage Vu shown in FIG. 12(a) is output between the output terminals U and V in the relevant control period. The voltage Vu is the voltage Vr of the alternating current power supply 1 throughout the relevant control period.

As the switch element S1 is in an on-state, the circuit current of the inverter circuit 40 in the relevant control period flows along a path 7a from the alternating current power supply 1 through the switch element S1 and filter circuit 5 and load 6 to the alternating current power supply 1. At this time, the voltage Vr of the alternating current power supply 1 is output between the output terminals U and V.

Meanwhile, as the switch element S2 is in an on-state when the voltage Vr of the alternating current power supply 1 has negative polarity, the circuit current of the inverter circuit 40 in the relevant control period flows along a path 7b from the alternating current power supply 1 through the filter circuit 5 and load 6 and switch element S2 to the alternating current power supply 1. At this time, the voltage Vr of the alternating current power supply 1 is output between the output terminals U and V.

The circuit current continues to flow along the path 7a or path 7b for the duration of the relevant control period. Consequently, a path for current flowing through the reactor Lf1 is constantly configured in the relevant control period.

The circuit current flows through either the switch element S1 or S2 in the control period belonging to region 7. Consequently, it is only the switch element S1 or S2 that causes an occurrence of loss due to current flow. Also, as none of the elements carries out an on-off operation in this control period, no switching loss occurs.

Consequently, the power conversion device is such that when the operation of region 7 is carried out, power loss can be further reduced. In particular, when the voltage command Vu* is synchronized with the voltage Vr of the alternating current power supply 1, the power conversion device can operate in region 7 in a large number of periods. Consequently, in this case, the power conversion device is such that power loss can be further reduced.

The power conversion device shown in FIG. 1 can operate by the regions 1 to 7 being combined in accordance with the relationship between the voltage command Vu* and the voltage Vr of the alternating current power supply 1. For example, the power conversion device operates in region 7 when the alternating current power supply 1 is sound. Further, when the alternating current power supply 1 is abnormal, the power conversion device operates in one region of region 1 to region 6.

Further, movement between regions, including when the alternating current power supply is interrupted, is carried out in accordance with the same logical process, which is based on the relationship between the sizes of the voltage command Vu* and voltage Vr. Consequently, the power conversion device is such that there is no need to detect an interruption of the alternating current power supply. Also, even when there is movement between regions, the output voltage of the power conversion device is maintained at a voltage corresponding to the voltage command. Consequently, the power conversion device is such that there is no occurrence of output voltage disturbance caused by switching between control operations, either when the alternating current power supply 1 is sound or when there is trouble, including interruption.

Herein, when ripple or the like is included in the voltage Vr of the alternating current power supply 1, there is a possibility of the voltage determination circuit 112 falsely determining region 3 and region 4 before or after the voltage Vr crosses the zero voltage Vz. There is concern that false determination of region 3 and region 4 will lead to a short circuit of the alternating current power supply 1.

In this kind of case, it is preferred that the cycle of the voltage Vr of the alternating current power supply 1 is divided into three periods, those being periods 1 to 3.

For example, when in period 1 and period 2, the power conversion device operates in region 3 or region 4 (a first control mode). Meanwhile, when in period 3, the power conversion device operates in a second control mode, to be described hereafter.

Firstly, in FIG. 3, the control mode determination circuit 118 divides the cycle of the voltage Vr of the alternating current power supply 1 into periods 1 to 3. Periods 1 to 3 are divided based on the relationship between the sizes of the voltage Vr of the alternating current power supply 1 and a first reference voltage and second reference voltage.

Period 1 (a first period) is a period in which the voltage Vr of the alternating current power supply 1 is equal to or greater than the first reference voltage. Period 2 (a second period) is a period in which the voltage Vr is equal to or smaller than the second reference voltage. Period 3 (a third period) is a period in which the voltage Vr is smaller than the first reference voltage and greater than the second reference voltage.

The first reference voltage is a voltage set to a value slightly greater than the zero voltage Vz. The second reference voltage is a voltage set to a value slightly smaller than the zero voltage Vz. Provided that the first and second reference voltages are set in this way, the third period can be a limited period before and after the voltage Vr crosses the zero voltage Vz.

Next, when the relevant control period is in period 1 or period 2, the control mode determination circuit 118 sets a control mode signal M to the first control mode, and outputs the control mode signal M. Also, when the relevant control period is in period 3, the control mode determination circuit 118 sets the control mode signal M to the second control mode, and outputs the control mode signal M. The control mode signal M is input into the voltage command generator circuit 111 and voltage determination circuit 112.

Hereafter, using FIG. 13 and FIG. 14, a description will be given mainly of the operation of the control circuit 100 and the operation of the power conversion device when the control mode signal M is in the second control mode. The operation of the control circuit 100 and the operation of the power conversion device when the control mode signal M is in the first control mode is as described using FIG. 3 to FIG. 12.

Figure 13:
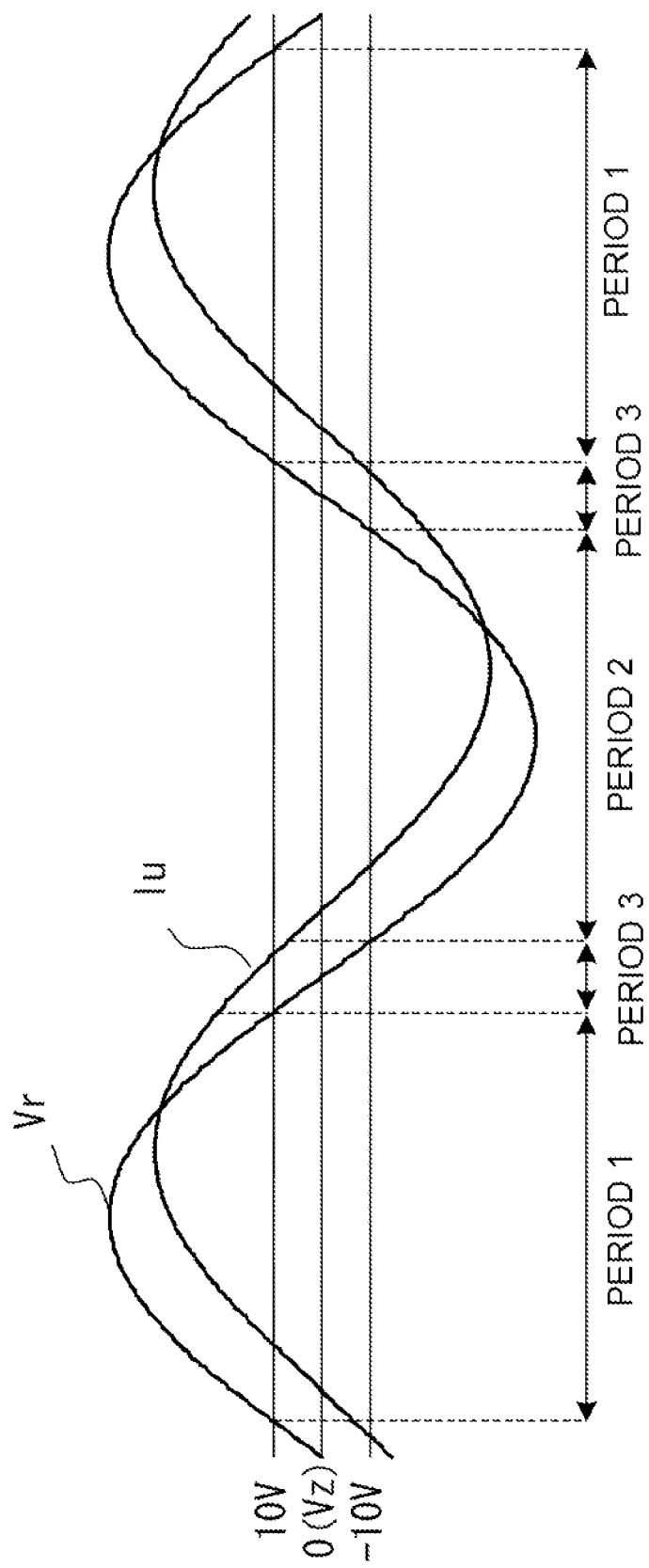
FIG. 13 is a diagram for illustrating periods 1 to 3.

FIG. 13 is a diagram for illustrating an embodiment wherein the power conversion device shown in FIG. 1 operates by the voltage cycle of the alternating current power supply 1 being divided into the three periods 1 to 3. In FIG. 13, a current Iu output from the output terminal U of the inverter circuit 40 and flowing through the load 6 is also shown together with the voltage Vr of the alternating current power supply 1. The alternating current voltage Vu output from the output terminal U of the inverter circuit 40 is synchronous with the voltage Vr of the alternating current power supply 1.

For example, the voltage Vr of the alternating current power supply 1 is assumed to be 250V AC, and the output voltage Vu assumed to be 200 VAC. Further, the first reference voltage is assumed to be in the region of 10V, and the second reference voltage assumed to be in the region of −10V. In this case, deviation of the output voltage Vu (deviation of the fundamental wave component) occurring at the timing of switching between period 1 and period 3 and switching between period 2 and period 3 is in the region of 2V. Provided that the first and second reference voltages are set in this way, the effect of waveform distortion of the output voltage Vu can be reduced to a minimum.

Figure 14:
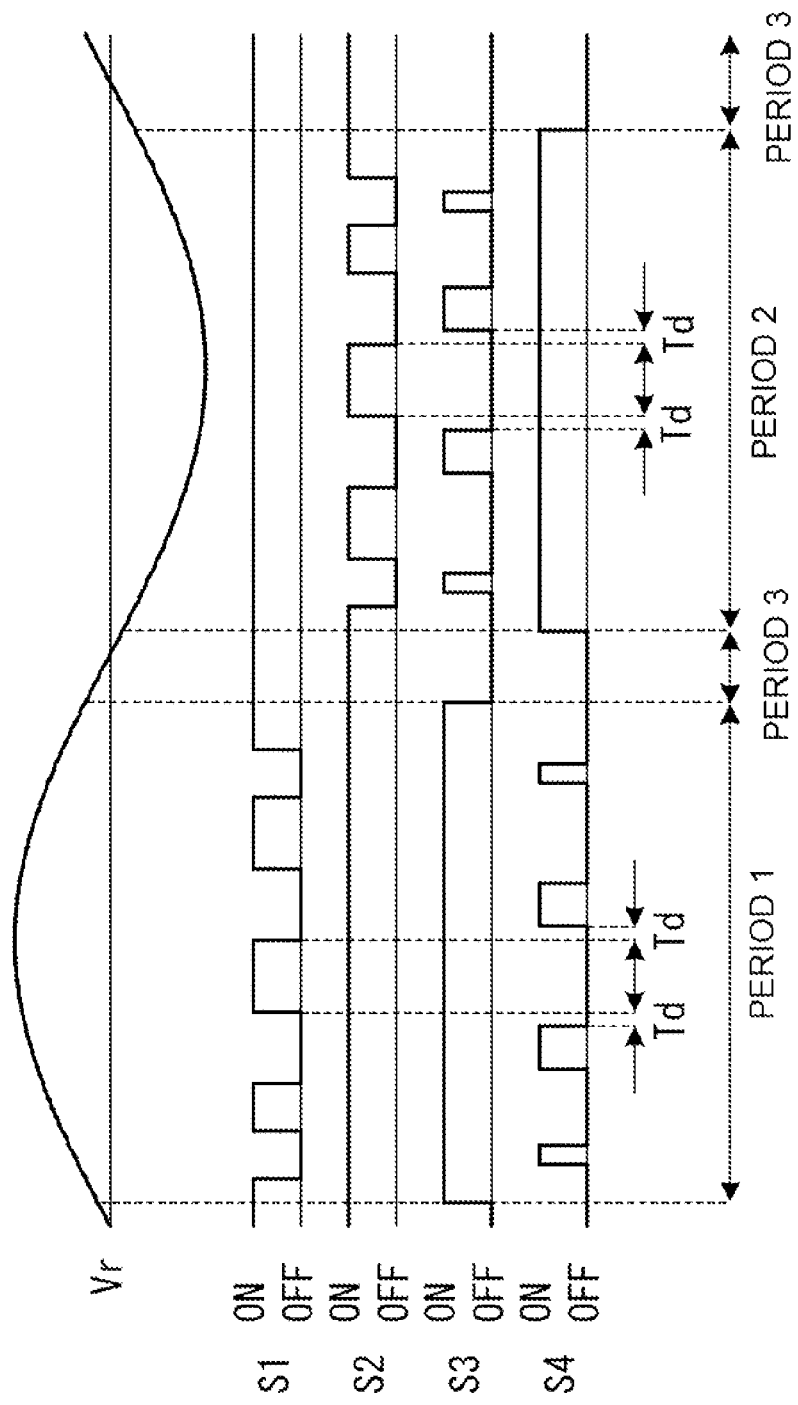
FIG. 14 is a diagram for illustrating operations of each element in periods 1 to 3.

FIG. 14 is a diagram for illustrating an operation of the power conversion device when the voltage command Vu* is synchronous with the voltage Vr of the alternating current power supply 1 and the amplitude of the voltage command Vu* is equal to or smaller than the amplitude of the voltage Vr of the alternating current power supply 1. In this case, the power conversion device operates in region 3 when the voltage Vr of the alternating current power supply 1 is equal to or greater than the zero voltage Vz. Also, the power conversion device operates in region 4 when the voltage Vr of the alternating current power supply 1 is lower than the zero voltage Vz.

When the power conversion device operates in region 3 or region 4, the switching elements Q1 and Q2 are constantly in an off-state. Consequently, only the operations of the switch elements S1 to S4 are shown in FIG. 14.

Firstly, when in period 1, the power conversion device operates in region 3. Consequently, the control circuit 100 generates the control signals Gs2 and Gs3 in order to keep the switch elements S2 and S3 constantly in an on-state. Also, the control circuit 100 generates the control signals Gs1 and Gs4 in order to cause the switch elements S1 and S4 to alternately carry out on-off operations. The control signals Gs1 and Gs4 are pulse width modulated in order to output a predetermined alternating current voltage.

When the switch element S1 switches from an on-state to an off-state, and the switch element S4 switches from an off-state to an on-state, the idle period Td for which the two elements are simultaneously in an off-state is provided in the control signals Gs1 and Gs4 of the two elements. In the same way, when the switch element S4 switches from an on-state to an off-state, and the switch element S1 switches from an off-state to an on-state, the idle period Td for which the two elements are simultaneously in an off-state is provided in the control signals Gs1 and Gs4 of the two elements.

By the switch element S1 being turned on, the current Iu flows along a path from the alternating current power supply 1 through the switch element S1 and filter circuit 5 and load 6 to the alternating current power supply 1. On the switch element S1 being turned off, the current Iu that has been flowing through the switch element 1 commutes along a path from the filter circuit 5 and load 6 through the switch element S3 to the filter circuit 5 and load 6. The current Iu continues to flow along the path from the filter circuit 5 and load 6 through the switch element S3 to the filter circuit 5 and load 6 for the idle period Td after the switch element S1 is turned off, the on-state period of the switch element S4, and the idle period Td after the switch element S4 is turned off. On the switch element S1 next being turned on, the current Iu that has been flowing through the switch element 3 commutes along the path from the alternating current power supply 1 through the switch element S1 and filter circuit 5 and load 6 to the alternating current power supply 1.

This operation of the power conversion device is the same as the operation of region 3 described using FIG. 7.

Immediately after switching from period 3 to period 1, the polarity of the current Iu may be negative. At this time, the current Iu flows along a path from the alternating current power supply 1 through the filter circuit 5 and load 6 and switch element S2 to the alternating current power supply 1, or a path from the filter circuit 5 and load 6 through the switch element S4 to the filter circuit 5 and load 6.

Next, when in period 2, the power conversion device operates in region 4. Consequently, the control circuit 100 generates the control signals Gs1 and Gs4 in order to keep the switch elements S1 and S4 constantly in an on-state. Also, the control circuit 100 generates the control signals Gs2 and Gs3 in order to cause the switch elements S2 and S3 to alternately carry out on-off operations. The control signals Gs2 and Gs3 are pulse width modulated in order to output a predetermined alternating current voltage.

When the switch element S2 switches from an on-state to an off-state, and the switch element S3 switches from an off-state to an on-state, the idle period Td for which the two elements are simultaneously in an off-state is provided in the control signals Gs2 and Gs3 of the two elements. In the same way, when the switch element S3 switches from an on-state to an off-state, and the switch element S2 switches from an off-state to an on-state, the idle period Td for which the two elements are simultaneously in an off-state is provided in the control signals Gs2 and Gs3 of the two elements.

By the switch element S2 being turned on, the current Iu flows along a path from the alternating current power supply 1 through the filter circuit 5 and load 6 and switch element S2 to the alternating current power supply 1. On the switch element S2 being turned off, the current Iu that has been flowing through the switch element 2 commutes along a path from the filter circuit 5 and load 6 through the switch element S4 to the filter circuit 5 and load 6. The current Iu continues to flow along the path from the filter circuit 5 and load 6 through the switch element S4 to the filter circuit 5 and load 6 for the idle period Td after the switch element S2 is turned off, the on-state period of the switch element S3, and the idle period Td after the switch element S3 is turned off. On the switch element S2 next being turned on, the current Iu that has been flowing through the switch element 4 commutes along the path from the alternating current power supply 1 through the filter circuit 5 and load 6 and switch element S2 to the alternating current power supply 1.

This operation of the power conversion device is the same as the operation of region 4 described using FIG. 8.

Immediately after switching from period 3 to period 2, the polarity of the current Iu may be positive. At this time, the current Iu flows along a path from the alternating current power supply 1 through the switch element S1 and filter circuit 5 and load 6 to the alternating current power supply 1, or a path from the filter circuit 5 and load 6 through the switch element S3 to the filter circuit 5 and load 6.

Next, when in period 3, the power conversion device is such that the voltage Vr of the alternating current power supply 1 is output to the output terminal U (the second control mode). Consequently, the control circuit 100 generates the control signals Gs1 to Gs4 in order to keep the switch elements S1 and S2 constantly in an on-state and to keep the switch elements S3 and S4 constantly in an off-state.

As the switch elements S1 and S2 are kept constantly in an on-state, the current Iu flows along the path from the alternating current power supply 1 through the switch element S1 and filter circuit 5 and load 6 to the alternating current power supply 1 in period 3 after period 1. Also, the current Iu flows along the path from the alternating current power supply 1 through the filter circuit 5 and load 6 and switch element S2 to the alternating current power supply 1 in period 3 after period 2. In either case, no switch element on-off operation takes place. Consequently, there is no occurrence in period 3 of surge voltage caused by inductive energy accumulated in the reactor Lf1.

It is preferable that switching from period 1 to period 3 is carried out at timing such that the switch elements S1 and S2 are simultaneously in an on-state. In the same way, it is preferable that switching from period 2 to period 3 is carried out at timing such that the switch elements S1 and S2 are simultaneously in an on-state. Provided that switching of periods is carried out at this timing, it is possible to shift to period 3 while maintaining the on-state and off-state of the switch elements in period 1 or period 2. Further, as the on-off operations of the switch elements do not switch, there is no need to insert the idle period Td at this timing.

By period 3 being provided in the vicinity of the zero crossing of the alternating current power supply 1 in this way, it is possible to prevent false determination of region 3 and region 4 in the voltage determination circuit 112. Further, as the current Iu flows through only one element of the switch elements S1 and S2, and neither of the elements carries out an on-off operation, in period 3, power loss can be reduced. Also, as a path along which the current Iu flows is constantly configured, it is possible to suppress the occurrence of surge voltage caused by inductive energy accumulated in the reactor Lf1.

Concern that the voltage determination circuit 112 will falsely determine the region before or after the voltage Vr crosses the zero voltage Vz may also occur when the power conversion device is operating in another region. Consequently, dividing the cycle of the voltage Vr of the alternating current power supply 1 into the three periods 1 to 3, as heretofore described, is also effective when the power conversion device operates in another region.

Figure 15:
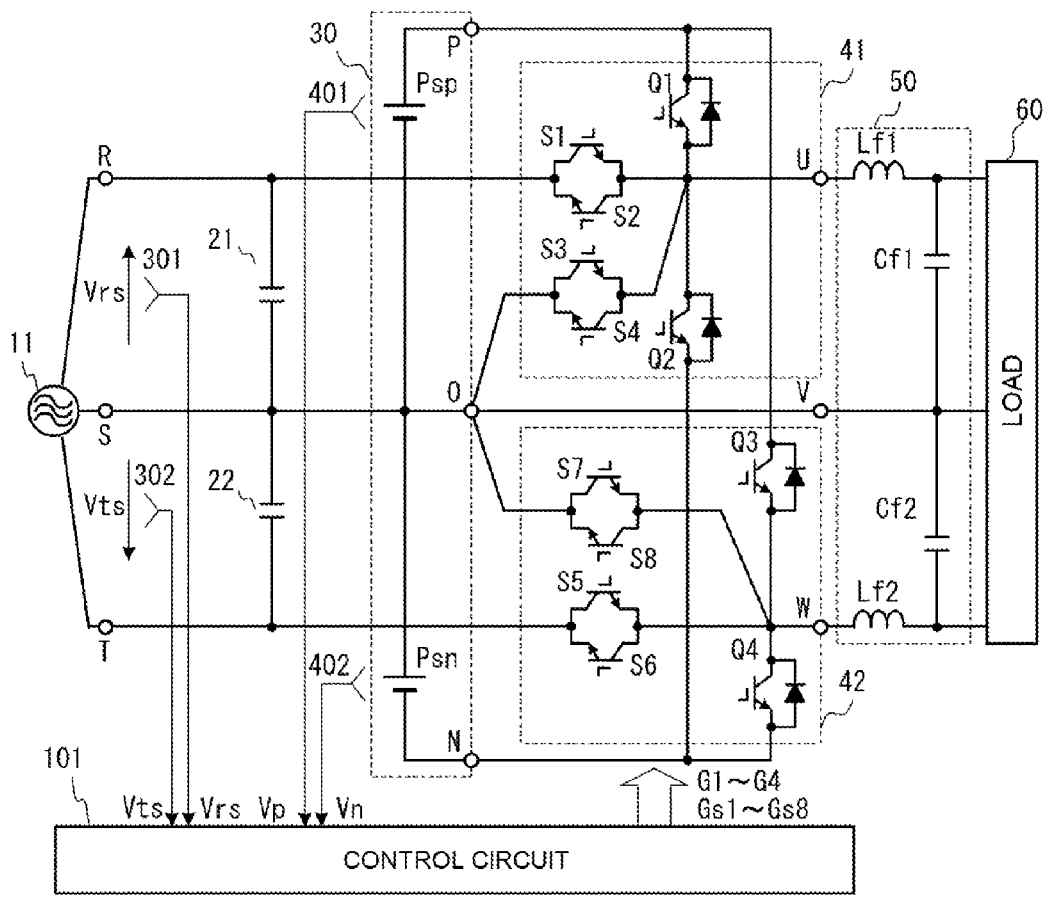
FIG. 15 is a diagram for illustrating another embodiment of the invention.

Next, FIG. 15 is a diagram for illustrating another embodiment of a power conversion device to which the invention is applied. The power conversion device is such that a 3-phase alternating current power supply 11 and a 3-phase load 60 are delta-connected using two of the inverter circuit shown in FIG. 1. That is, the power conversion device is such that a terminal S of the alternating current power supply 11 is connected to a V-phase terminal of the load 60, and is connected to the neutral point terminal O of the direct current power supply series circuit 30. Further, an inverter circuit 41 is connected between a terminal R of the alternating current power supply 11 and a U-phase terminal of the load 60. Also, an inverter circuit 42 is connected between a terminal T of the alternating current power supply 11 and a W-phase terminal of the load 60.

The power conversion device is such that the inverter circuit 41 outputs alternating current voltage between the output terminals U and V using four levels of voltage, those being the positive voltage Vp, negative voltage Vn, zero voltage Vz, and an alternating current voltage Vrs. Also, the inverter circuit 42 outputs alternating current voltage between the output terminals W and V using four levels of voltage, those being the positive voltage Vp, negative voltage Vn, zero voltage Vz, and an alternating current voltage Vts.

The power conversion device is such that the inverter circuits 41 and 42 can be caused to carry out the operations of region 1 to region 6 in each control period. Owing to these operations, power loss can be reduced in the same way as in the embodiment described using FIG. 1 to FIG. 12. Also, as movement between regions can be carried out in accordance with the same logical process, there is no need to detect an interruption of the alternating current power supply 11. Also, there is no occurrence of disturbance in the output voltage Vu when the alternating current power supply 11 is interrupted.

Also, the power conversion device is such that loss in reactors Lf1 and Lf2 can be reduced, and the size of the reactors Lf1 and Lf2 can be reduced.

Also, the power conversion device is such that the inverter circuits 41 and 42 can be caused to carry out the operation of region 7 in each control period. Owing to this operation, power loss can be further reduced.

Also, the power conversion device is such that the inverter circuits 41 and 42 can be caused to operate by dividing the cycle of the voltage command into periods 1 to 3. Owing to these operations, surge voltage caused by the reactors Lf1 and Lf2 can be reduced in the same way as in the embodiment described using FIG. 11 and FIG. 12.

Figure 16:
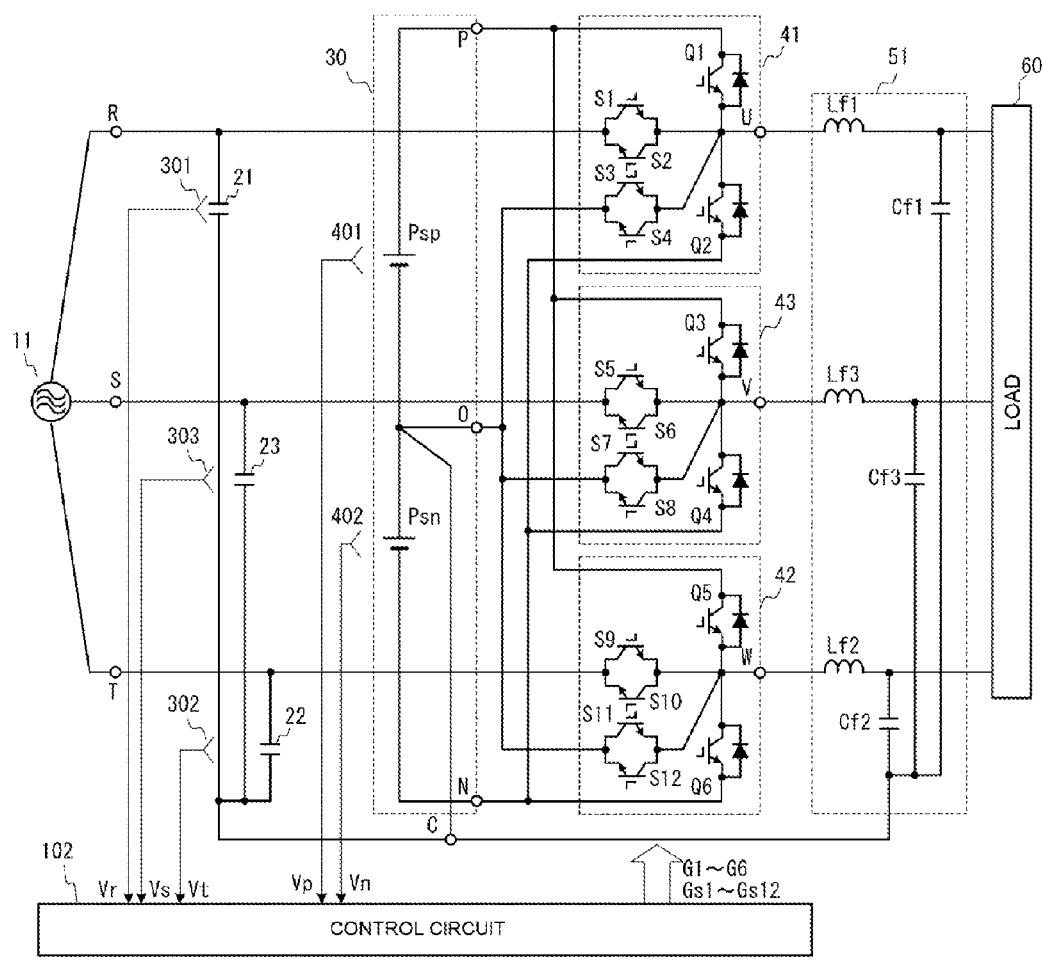
FIG. 16 is a diagram for illustrating another embodiment of the invention.

Next, FIG. 16 is a diagram for illustrating another embodiment of a power conversion device to which the invention is applied. The power conversion device is such that the 3-phase alternating current power supply 11 and 3-phase load 60 are star-connected using three of the inverter circuit shown in FIG. 1. That is, the power conversion device is such that the inverter circuit 41 is connected between the terminal R of the alternating current power supply 11 and the U-phase terminal of the load 60, an inverter circuit 43 is connected between the terminal S of the alternating current power supply 11 and a V-phase terminal of the load 60, and the inverter circuit 42 is connected between the terminal T of the alternating current power supply 11 and the W-phase terminal of the load 60. Also, the power conversion device is such that the inverter circuits 41 to 43 are connected in parallel to the direct current power supply series circuit.

The power conversion device is such that the inverter circuit 41 outputs U-phase alternating current voltage to the output terminal U using four levels of voltage, those being the positive voltage Vp, negative voltage Vn, zero voltage Vz, and an alternating current voltage Vr. Also, the inverter circuit 43 outputs V-phase alternating current voltage to the output terminal V using four levels of voltage, those being the positive voltage Vp, negative voltage Vn, zero voltage Vz, and an alternating current voltage Vs. Also, the inverter circuit 42 outputs W-phase alternating current voltage to the output terminal W using four levels of voltage, those being the positive voltage Vp, negative voltage Vn, zero voltage Vz, and an alternating current voltage Vt.

The power conversion device is such that the inverter circuits 41 to 43 can be caused to carry out the operations of region 1 to region 6 in each control period. Owing to these operations, there is no need for a transformer of commercial frequency for voltage superposition. Further, the power conversion device is such that power loss can be reduced in the same way as in the embodiment described using FIG. 1 to FIG. 12. Also, the power conversion device is such that loss in reactors Lf1 to Lf3 can be reduced, and the size of the reactors Lf1 to Lf3 can be reduced.

Also, the power conversion device is such that the inverter circuits 41 to 43 can be caused to carry out the operation of region 7 in each control period. Owing to this operation, power loss can be further reduced. Also, as movement between regions can be carried out in accordance with the same logical process, there is no need to detect an interruption of the alternating current power supply 11. Also, there is no occurrence of disturbance in the output voltage Vu when the alternating current power supply 11 is interrupted.

Also, the power conversion device is such that the inverter circuits 41 to 43 can be caused to operate by dividing the cycle of the voltage command into periods 1 to 3. Owing to these operations, surge voltage caused by the reactors Lf1 to Lf3 can be reduced in the same way as in the embodiment described using FIG. 11 and FIG. 12.

INDUSTRIAL APPLICABILITY

The invention is applicable to a device, such as a momentary voltage drop compensation device or uninterruptible power supply device, for supplying a stable voltage to a load even when voltage fluctuation in an alternating current power supply or interruption of the alternating current power supply occurs.

REFERENCE SIGNS LIST 1, 11 Alternating current power supply
2, 21 to 23 Capacitor
3, 31 Converter circuit
30 Direct current power supply series circuit
4, 40 to 43 Inverter circuit
5, 51 Filter circuit
6, 60 Load
100 to 102 Control circuit

What is claimed is:

1. A power conversion device, comprising:
an inverter circuit having
a switching element series circuit formed by a positive side switching element connected to a positive side terminal of a direct current power supply series circuit, which has a connection point of a first direct current power supply and second direct current power supply as a neutral point terminal, and a negative side switching element connected to a negative side terminal of the direct current power supply series circuit being connected in series,
a first output terminal connected to a connection point of the positive side switching element and negative side switching element,
a second output terminal connected to the neutral point terminal,
a first bidirectional switch, formed by a first switch element and second switch element being connected in anti-parallel or anti-series, connected between an end of an alternating current power supply, of which another end is connected to the neutral point terminal, and the first output terminal, and
a second bidirectional switch, formed by a third switch element and fourth switch element being connected in anti-parallel or anti-series, connected between the first and second output terminals; and
a control circuit that divides a cycle of a voltage command into a plurality of control periods, and generates control signals that cause first and second elements selected from among the positive side and negative side switching elements and first to fourth switch elements to be turned and off in a complementary way either side of an idle period in each control period, and control signals that keep non-selected elements in an on-state or off-state, wherein
the power conversion device, by the elements being caused to operate based on the control signals generated in each control period, operates in a first control mode wherein alternating current voltage in accordance with the voltage command is output between the first and second output terminals.

2. The power conversion device according to claim 1, wherein
the control circuit, when the voltage command is equal to or greater than a zero voltage, which is a potential of the neutral point terminal, and the voltage of the alternating current power supply is equal to or smaller than the zero voltage in a control period for which the power conversion device operates in the first control mode, generates
control signals that cause the positive side switching element to be turned on and off as a first element and the fourth switch element to be turned on and off as a second element, and
control signals that cause the negative side switching element and the first and second switch elements to be turned off and the third switch element to be turned on.

3. The power conversion device according to claim 1, wherein
the control circuit, when the voltage command is equal to or greater than a zero voltage, which is a potential of the neutral point terminal, the voltage of the alternating current power supply is greater than the zero voltage, and the voltage command is greater than the voltage of the alternating current power supply in a control period for which the power conversion device operates in the first control mode, generates
control signals that cause the positive side switching element to be turned on and off as a first element and the second switch element to be turned on and off as a second element, and
control signals that cause the negative side switching element and the third and fourth switch elements to be turned off and the first switch element to be turned on.

4. The power conversion device according to claim 1, wherein
the control circuit, when the voltage command is equal to or greater than a zero voltage, which is a potential of the neutral point terminal, the voltage of the alternating current power supply is greater than the zero voltage, and the voltage command is equal to or smaller than the voltage of the alternating current power supply in a control period for which the power conversion device operates in the first control mode, generates
control signals that cause the first switch element to be turned on and off as a first element and the fourth switch element to be turned on and off as a second element, and
control signals that cause the positive side and negative side switching elements to be turned off and the second and third switch elements to be turned on.

5. The power conversion device according to claim 1, wherein
the control circuit, when the voltage command and the voltage of the alternating current power supply are smaller than a zero voltage, which is a potential of the neutral point terminal, and the voltage command is equal to or greater than the voltage of the alternating current power supply in a control period for which the power conversion device operates in the first control mode, generates
control signals that cause the second switch element to be turned on and off as a first element and the third switch element to be turned on and off as a second element, and
control signals that cause the positive side and negative side switching elements to be turned off and the first and fourth switch elements to be turned on.

6. The power conversion device according to claim 1, wherein the control circuit, when the voltage command and the voltage of the alternating current power supply are smaller than a zero voltage, which is a potential of the neutral point terminal, and the voltage command is smaller than the voltage of the alternating current power supply in a control period for which the power conversion device operates in the first control mode, generates control signals that cause the negative side switching element to be turned on and off as a first element and the first switch element to be turned on and off as a second element, and control signals that cause the positive side switching element and the third and fourth switch elements to be turned off and the second switch element to be turned on.

7. The power conversion device according to claim 1, wherein the control circuit, when the voltage command is smaller than a zero voltage, which is a potential of the neutral point terminal, and the voltage of the alternating current power supply is equal to or greater than the zero voltage in a control period for which the power conversion device operates in the first control mode, generates control signals that cause the negative side switching element to be turned on and off as a first element and the third switch element to be turned on and off as a second element, and control signals that cause the positive side switching element and the first and second switch elements to be turned off and the fourth switch element to be turned on.

8. The power conversion device according to claim 1, wherein the control circuit, when a deviation between the voltage command and the voltage of the alternating current power supply is within a range specified in advance in a control period for which the power conversion device operates in the first control mode, generates control signals that cause the first and second switch elements to be turned on, and control signals that cause the positive side and negative side switching elements and the third and fourth switch elements to be turned off.

9. The power conversion device according to claim 1, wherein an average value of the voltage output between the first and second output terminals in the control period is equivalent to the voltage command in the control period.

10. A power conversion device wherein a 3-phase alternating current power supply and a 3-phase load are delta-connected using two of the power conversion devices according to claim 9.

11. A power conversion device wherein a 3-phase alternating current power supply and a 3-phase load are star-connected using three of the power conversion devices according to claim 9.

12. The power conversion device according to claim 1, wherein the control circuit synchronizes the voltage command with the voltage of the alternating current power supply, divides the voltage cycle of the alternating current power supply into a first period wherein the voltage of the alternating current power supply is equal to or greater than a first reference voltage, a second period wherein the voltage of the alternating current power supply is equal to or smaller than a second reference voltage smaller than the first reference voltage, and a third period wherein the voltage of the alternating current power supply is smaller than the first reference voltage and greater than the second reference voltage, generates a control signal such that the power conversion device operates in the first control mode in the first period and second period, and generates control signals that cause the first and second switch elements to be turned on, and control signals that cause the positive side and negative side switching elements and the third and fourth switch elements to be turned off, in the third period, wherein the power conversion device operates in a second control mode wherein the voltage of the alternating current power supply is output between the first and second output terminals in the third period.

13. The power conversion device according to claim 12, wherein the first reference voltage is a voltage greater than a zero voltage, which is a potential of the neutral point terminal, and the second reference voltage is a voltage smaller than the zero voltage.

14. The power conversion device according to claim 13, wherein switching from the first control mode to the second control mode is carried out when the first and second switch elements are simultaneously in an on-state.

15. A power conversion device wherein a 3-phase alternating current power supply and a 3-phase load are delta-connected using two of the power conversion devices according to claim 14.

16. A power conversion device wherein a 3-phase alternating current power supply and a 3-phase load are star-connected using three of the power conversion devices according to claim 14.

17. An apparatus, comprising:

a first switching device with a first terminal connected to a first terminal of a direct current power source;

a second switching device connected to a second terminal of the first switching device and to a second terminal of the direct current power source;

a third switching device with a first terminal connected to the second terminal of the first switching device and to a first power conversion output terminal, and with a second terminal connected to a first terminal of an alternating current power supply;

a fourth switching device with a first terminal connected to the second terminal of the first switching device and to the first power conversion output terminal, and with a second terminal connected to a neutral point, the neutral point corresponding to a second terminal of the alternating current power supply and to a second power conversion output terminal; and a control unit configured to output control signals to switch the first, second, third and fourth switching devices on and off based on conditions including voltage levels of a voltage command relative to the neutral point, the voltage command including an amplitude of an alternating current voltage to be supplied to a load connected to the first and second power conversion output terminals.

18. The apparatus of claim 17, wherein the conditions further include voltage levels of the alternating current power supply relative to the neutral point.

19. The apparatus of claim 18, wherein the conditions further include voltage levels of the voltage command relative to alternating current power supply.

20. The apparatus of claim 19, wherein the first and second switching devices each include a switching element connected in parallel with a diode, and the third and fourth switching devices each include switching elements connected in anti-parallel.

* * * * *